United States Patent
Ida et al.

(10) Patent No.: US 11,228,715 B2
(45) Date of Patent: Jan. 18, 2022

(54) VIDEO SURVEILLANCE SYSTEM AND VIDEO SURVEILLANCE METHOD

(71) Applicant: NEC CORPORATION, Tokyo (JP)

(72) Inventors: Kenichiro Ida, Tokyo (JP); Hiroshi Kitajima, Tokyo (JP); Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/288,195

(22) Filed: Feb. 28, 2019

(65) Prior Publication Data
US 2019/0199932 A1     Jun. 27, 2019

Related U.S. Application Data

(63) Continuation of application No. 15/561,572, filed as application No. PCT/JP2015/059737 on Mar. 27, 2015, now Pat. No. 11,019,268.

(51) Int. Cl.
| | | |
|---|---|---|
| *H04N 5/232* | (2006.01) | |
| *G06K 9/00* | (2006.01) | |
| *H04N 5/247* | (2006.01) | |
| *G08B 13/196* | (2006.01) | |
| *H04N 7/18* | (2006.01) | |

(52) U.S. Cl.
CPC ..... *H04N 5/23296* (2013.01); *G06K 9/00228* (2013.01); *G06K 9/00711* (2013.01); *G06K 9/00771* (2013.01); *G08B 13/19608* (2013.01); *G08B 13/19645* (2013.01); *H04N 5/232* (2013.01); *H04N 5/23218* (2018.08); *H04N 5/23293* (2013.01); *H04N 5/247* (2013.01);
(Continued)

(58) Field of Classification Search
CPC ........... H04N 5/23296; H04N 5/23218; H04N 5/232; H04N 5/232293; H04N 5/247; H04N 5/23299; H04N 5/232061; H04N 7/181; G06K 9/00228; G06K 9/00711; G06K 9/00771; G06K 2009/00738; G08B 13/19608; G08B 13/19645
See application file for complete search history.

(56) References Cited

U.S. PATENT DOCUMENTS

2004/0263625 A1   12/2004   Ishigami
2005/0078184 A1*   4/2005   Sakai .............. G08B 13/19643
                                                            348/143
(Continued)

FOREIGN PATENT DOCUMENTS

| JP | 8-16898 A | 1/1996 |
| JP | 11152034 A | 6/1999 |

(Continued)

OTHER PUBLICATIONS

International Preliminary Report on Patentability of PCT/JP2015/059737 dated Jul. 25, 2017.
(Continued)

*Primary Examiner* — Maria E Vazquez Colon
(74) *Attorney, Agent, or Firm* — Sughrue Mion, PLLC

(57) ABSTRACT

A video surveillance system includes: a detection unit that detects a predetermined event on the basis of an image captured by a first imaging apparatus; and a control unit that controls a second imaging apparatus such that the second imaging apparatus captures an image of a predetermined position after the detection of the predetermined event.

13 Claims, 15 Drawing Sheets

(52) U.S. Cl.
CPC ... *H04N 7/181* (2013.01); *G06K 2009/00738* (2013.01)

(56) References Cited

U.S. PATENT DOCUMENTS

| | | | | |
|---|---|---|---|---|
| 2011/0007139 A1* | 1/2011 | Brunetti | ............ | G08B 13/19669 348/51 |
| 2014/0339374 A1* | 11/2014 | Mian | .................. | G08B 13/1436 246/473.1 |
| 2015/0244991 A1 | 8/2015 | Noda et al. | | |
| 2015/0334299 A1 | 11/2015 | Tsuneno | | |
| 2015/0371078 A1 | 12/2015 | Shiraishi | | |
| 2016/0189500 A1* | 6/2016 | Kim | ................ | G08B 13/19645 386/223 |

FOREIGN PATENT DOCUMENTS

| | | | |
|---|---|---|---|
| JP | 2000272863 A | | 10/2000 |
| JP | 2002-092751 A | | 3/2002 |
| JP | 2004-343718 A | | 12/2004 |
| JP | 2005-117542 A | | 4/2005 |
| JP | 2005-333628 A | | 12/2005 |
| JP | 2006-080601 A | | 3/2006 |
| JP | 2009-255654 A | | 11/2009 |
| JP | 2010-128727 A | | 6/2010 |
| JP | 2012-212407 A | | 11/2012 |
| JP | 201424400 A | | 2/2014 |
| JP | 2014024400 A | * | 2/2014 |
| JP | 201459649 A | | 4/2014 |
| JP | 2015-002553 A | | 1/2015 |

OTHER PUBLICATIONS

International Search Report of PCT/JP2015/059737 dated Jun. 16, 2015.
Office Action dated Jun. 18, 2019 in Japanese Application No. 2017-508858.
Communication dated Jul. 31, 2019 from the United States Patent and Trademark Office in U.S. Appl. No. 15/561,572.
Communication dated Jun. 2, 2020, issued by the Japanese Patent Office in application No. 2019-169070.
An Office Action dated Feb. 7, 2020, which issued during the prosecution of U.S. Appl. No. 15/561,572.
Communication dated Dec. 1, 2020, from the Japanese Patent Office in application No. 2019169070.
Japanese Decision of Dismissal of Amendment for JP Application No. 2019-169070 dated Apr. 13, 2021 with English Translation.
Japanese Office Action for JP Application No. 2019-169070 dated Apr. 13, 2021 with English Translation.

* cited by examiner

FIG. 4

| CAMERA ID | SURVEILLANCE POSITION ID | SURVEILLANCE POSITION (COMMON COORDINATES) | CAMERA PARAMETER |
|---|---|---|---|
| 001 | 001 | LINE SEGMENT : (x1, y1), (x2, y2) | PARAMETER 01 |
| 001 | 002 | REGION : (x3, y3), (x4, y4) | PARAMETER 02 |
| 002 | 002 | REGION : (x3, y3), (x4, y4) | PARAMETER 03 |
| ⋮ | ⋮ | | ⋮ |

FIG. 8

| CAMERA ID | SURVEILLANCE TARGET POSITION ID | DETECTION TARGET POSITION ID | DETECTION TARGET POSITION (COMMON COORDINATES) | CAMERA PARAMETER (IMAGE CAPTURING OF SURVEILLANCE TARGET POSITION) |
|---|---|---|---|---|
| 001 | 001 | 001 | LINE SEGMENT : (x1, y1), (x2, y2) | PARAMETER 01 |
| 002 | 001 | — | — | PARAMETER 02 |
| 003 | 001 | — | — | PARAMETER 03 |
| 003 | 002 | 002 | REGION : (x3, y3), (x4, y4) | — |
| 004 | 002 | — | — | PARAMETER 04 |
| ⋮ | ⋮ | | | ⋮ |

VIDEO SURVEILLANCE SYSTEM AND VIDEO SURVEILLANCE METHOD

CROSS REFERENCE TO RELATED APPLICATIONS

This application is a Continuation Application of U.S. patent application Ser. No. 15/561,572, filed Sep. 26, 2017, which is a National Stage of International Application No. PCT/JP2015/059737 filed Mar. 27, 2015, the disclosures of the prior applications are incorporated herein in their entirety.

TECHNICAL FIELD

The present invention relates to a video surveillance technique.

BACKGROUND ART

There are surveillance systems using a plurality of surveillance (security) cameras. Patent Document 1 proposes a surveillance method in which multiple cameras including a rotating camera capable of controlling panning, tilting, and zooming cooperate with each other to display an intruding object in an enlarged manner without blind spots with a minimum number of cameras. In this method, while an intruder is not detected in the surveillance space, two rotating cameras capture images of their surveillance spaces in a wide area so as to mutually compensate for the blind spots. When an intruder is detected in the surveillance space on the basis of the image captured by one camera, the coordinates on the surveillance space of the intruder are calculated, and the other camera is controlled so as to perform image capturing in the direction of the coordinates in an enlarged manner.

Patent Document 2 proposes a surveillance camera system that causes a master camera and a slave camera to cooperate with each other so as to capture an image of a player who is a surveillance target object. In the system, when the master camera captures the image of the surveillance target object, on the basis of the image capturing direction of the master camera and the position information of the master camera and the slave camera, the image capturing direction of the slave camera is calculated. Then, by directing the image capturing direction of the slave camera to the calculated direction, the master camera and the slave camera can cooperatively capture an image of the surveillance target object.

RELATED DOCUMENT

Patent Document

[Patent Document 1] Japanese Unexamined Patent Publication No. 2004-343718
[Patent Document 2] Japanese Unexamined Patent Publication No. 2005-333628

SUMMARY OF THE INVENTION

Technical Problem

In each of the above proposed methods for operating cameras (imaging apparatuses) in cooperation, images of persons are captured through a plurality of cameras such that a person such as an intruder can be monitored without blind spots. That is, in each of the proposed methods, in a case where a certain imaging apparatus detects a person such as an intruder, another imaging apparatus is directed to the person. However, in such a method, surveillance efficiency decreases in a scene where multiple persons come and go. That is, in a case of applying each of the above proposed methods to the scene where multiple persons come and go, cameras are controlled every time in response to all of many persons coming and going. Thus, the surveillance efficiency decreases.

The present invention has been made in consideration of such situations, and provides a technique for efficiently performing surveillance through a plurality of imaging apparatuses.

Solution to Problem

In aspects of the present invention, in order to solve the above-mentioned problems, the following configurations are respectively adopted.

A first aspect relates to a video surveillance system. The video surveillance system according to the first aspect includes: a detection unit that detects a predetermined event on the basis of an image captured by a first imaging apparatus; and a control unit that controls a second imaging apparatus such that the second imaging apparatus captures an image of a predetermined position after the detection of the predetermined event.

A second aspect relates to a video surveillance method executed by at least one computer. The video surveillance method according to the second aspect includes: detecting a predetermined event on the basis of an image captured by a first imaging apparatus; and controlling a second imaging apparatus such that the second imaging apparatus captures an image of a predetermined position after the detection of the predetermined event.

Note that, according to another aspect of the present invention, a program for causing at least one computer to execute the method of the second aspect may be employed, or a storage medium, in which such a program is recorded and which can be read by the computer, may be employed. The storage medium includes a non-transitory type medium.

Advantageous Effects of Invention

According to the above aspects, it is possible to provide a technique for efficiently performing surveillance through a plurality of imaging apparatuses.

BRIEF DESCRIPTION OF THE DRAWINGS

The above-mentioned objects and other objects, features and advantages will become more apparent with reference to the preferred exemplary embodiments to be described later and the accompanying drawings.

FIG. 4 is a diagram illustrating an example of correspondence relationship information stored in a correspondence storage unit.

FIG. 8 is a diagram illustrating an example of correspondence relationship information further stored in the correspondence storage unit.

DESCRIPTION OF EXEMPLARY EMBODIMENTS

First, in order to facilitate understanding of exemplary embodiments of the present invention, the background of the present invention will be described.

There is a surveillance system that controls, in a case where a certain surveillance camera detects an object such as a person or a vehicle, other surveillance cameras. According to such a surveillance system, a plurality of surveillance cameras can comprehensively monitor an intruder or the like in cooperation with each other. However, since such a surveillance system is assumed to be applied to a prohibited area in which persons are not allowed to intrude and a scene where the appearance of persons is limited to some extent, if a person is simply detected, control of other cameras is started. Therefore, in such a scene where a large number of persons come and go or crowds are formed, such as street of a city or the like, a large-scale commercial facility, a major facility such as an airport, a terminal station, and a railway platform, a leisure facility, a sports facility, or a stadium, the surveillance cameras are controlled every time in response to detection of a person and therefore, the surveillance operation cannot be performed efficiently.

According to exemplary embodiments of the present invention to be described below, the above-mentioned problems are solved, and thus it is possible to efficiently perform the surveillance operation. However, the exemplary embodiments to be described later are respectively just examples, and the present invention is not limited to the configurations of the following exemplary embodiments.

First Exemplary Embodiment

[System Configuration]

Figure 1:
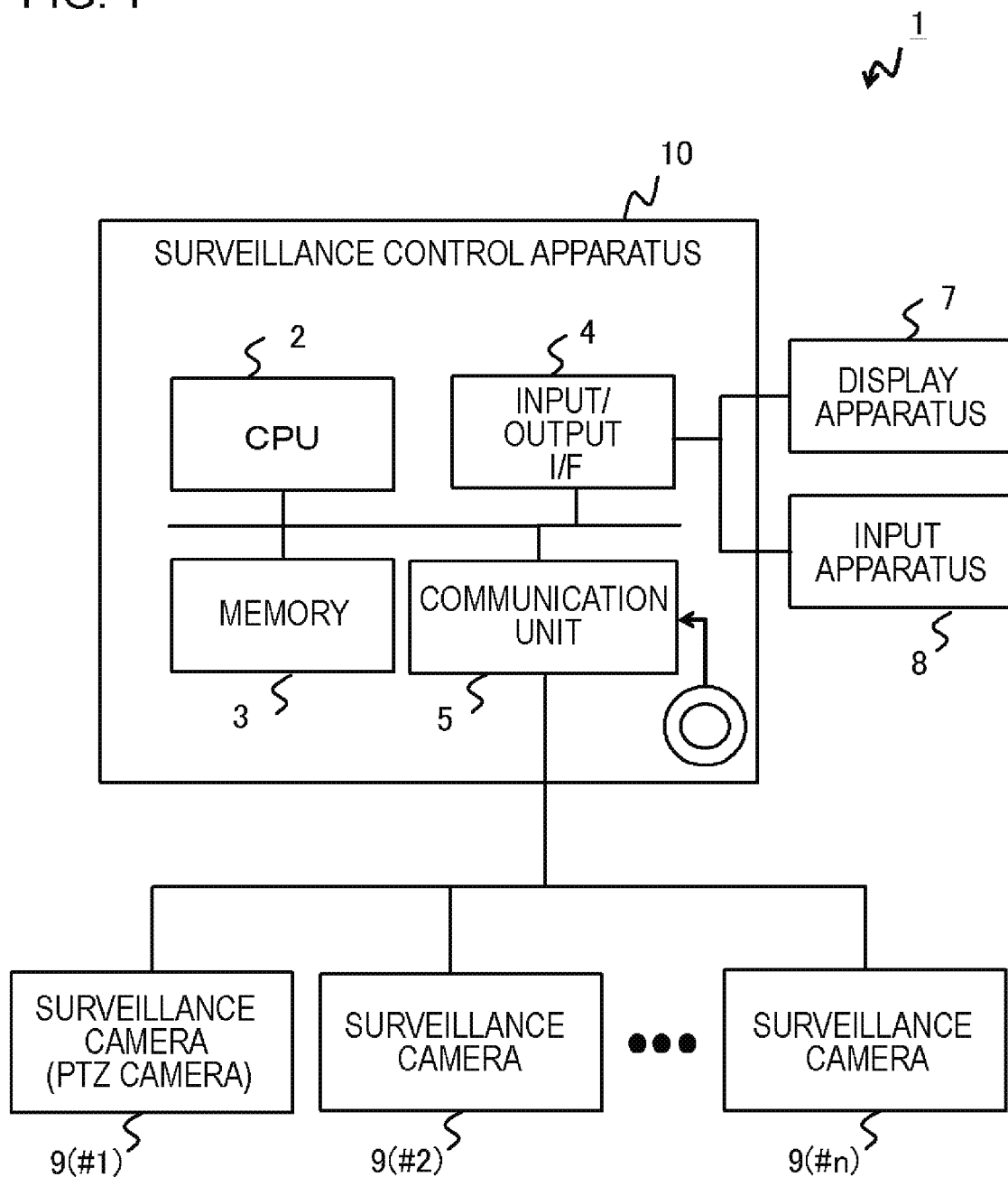
FIG. 1 is a diagram conceptually illustrating a hardware configuration example of a video surveillance system according to a first exemplary embodiment.

FIG. 1 is a diagram conceptually illustrating a hardware configuration example of a video surveillance system 1 (hereinafter may be abbreviated as a "system 1") in the first exemplary embodiment. The system 1 has a surveillance control apparatus 10, a plurality of surveillance cameras 9(#1), 9(#2) to 9(#n), and the like.

The plurality of surveillance cameras 9(#1), 9(#2) to 9(#n) include at least one movable camera capable of changing the image capturing direction. As long as the image capturing direction of the movable camera can be changed, the movable direction of the movable camera may only be in the vertical direction or may only be in the horizontal direction. In the following description, it is assumed that the surveillance camera 9(#1) is a pan-tilt-zoom (PTZ) camera. The other surveillance cameras 9(#2) and the like are fixed or movable cameras. Hereinafter, unless it is necessary to distinguish individual surveillance cameras, each surveillance camera is referred to as a "surveillance camera 9".

Each surveillance camera 9 is installed at a different place such that imaging regions of itself and at least one other surveillance camera 9 overlap. Each surveillance camera 9 sends a video signal (image frames) to a communication unit 5. The transmission rate of the image frames, which are sent by each surveillance camera 9 to the communication unit 5, is not limited. If the transmission rate of the image frames is high, the surveillance control apparatus 10 can acquire many image frames in a unit of time. Thus, it is possible to perform highly accurate surveillance control. The transmission rate of the image frames may be determined in accordance with the specification of the frame rate of each surveillance camera 9, the communication capacity between the surveillance control apparatus 10 and each surveillance camera 9, the accuracy required for the video surveillance system 1, and the like. Further, as long as each surveillance camera 9 can output a video signal, performance and functions thereof are not limited.

The surveillance control apparatus 10 is a so-called computer, and has, for example, a central processing unit (CPU) 2, a memory 3, an input/output interface (I/F) 4, the communication unit 5, and the like which are connected through a bus. Each number of hardware elements is not limited, and these hardware elements may be collectively referred to as an information processing circuit. The hardware configuration of the surveillance control apparatus 10 is not limited to the example shown in FIG. 1.

The CPU 2 may also include an application specific integrated circuit (ASIC), a digital signal processor (DSP), a graphics processing unit (GPU), and the like. The memory 3 includes a random access memory (RAM), a read only memory (ROM), and an auxiliary storage apparatus (such as a hard disk).

The input/output I/F4 can connect with user interface apparatuses such as a display apparatus 7, an input apparatus 8, a printer (not shown in the drawing), and a projection apparatus (not shown in the drawing). The display apparatus 7 is an apparatus such as a liquid crystal display (LCD) or a cathode ray tube (CRT) display, that displays a screen corresponding to drawing data processed by the CPU 2, a graphics processing unit (GPU) (not shown), or the like. The display apparatus 7 may display each of images obtained from video signals sent from the surveillance cameras 9. The input apparatus 8 is an apparatus such as a keyboard or a mouse that accepts an input of a user operation. Further, the surveillance control apparatus 10 may be mounted as a computer of a mobile device (a smart phone, a tablet, or the like), and a touch panel integrated with the display apparatus 7 and the input apparatus 8 may be connected to the input/output I/F4.

The communication unit 5 exchanges signals with other computers and devices through wired or wireless communication. In the present exemplary embodiment, the communication unit 5 communicates with the plurality of surveillance cameras 9. The communication method between the communication unit 5 and each surveillance camera 9 is not limited. For example, the communication unit 5 acquires the video signals from the respective surveillance cameras 9, and sends instruction signals to the surveillance cameras 9. Further, a portable storage medium or the like can also be connected to the communication unit 5.

[Processing Configuration]

Figure 2:
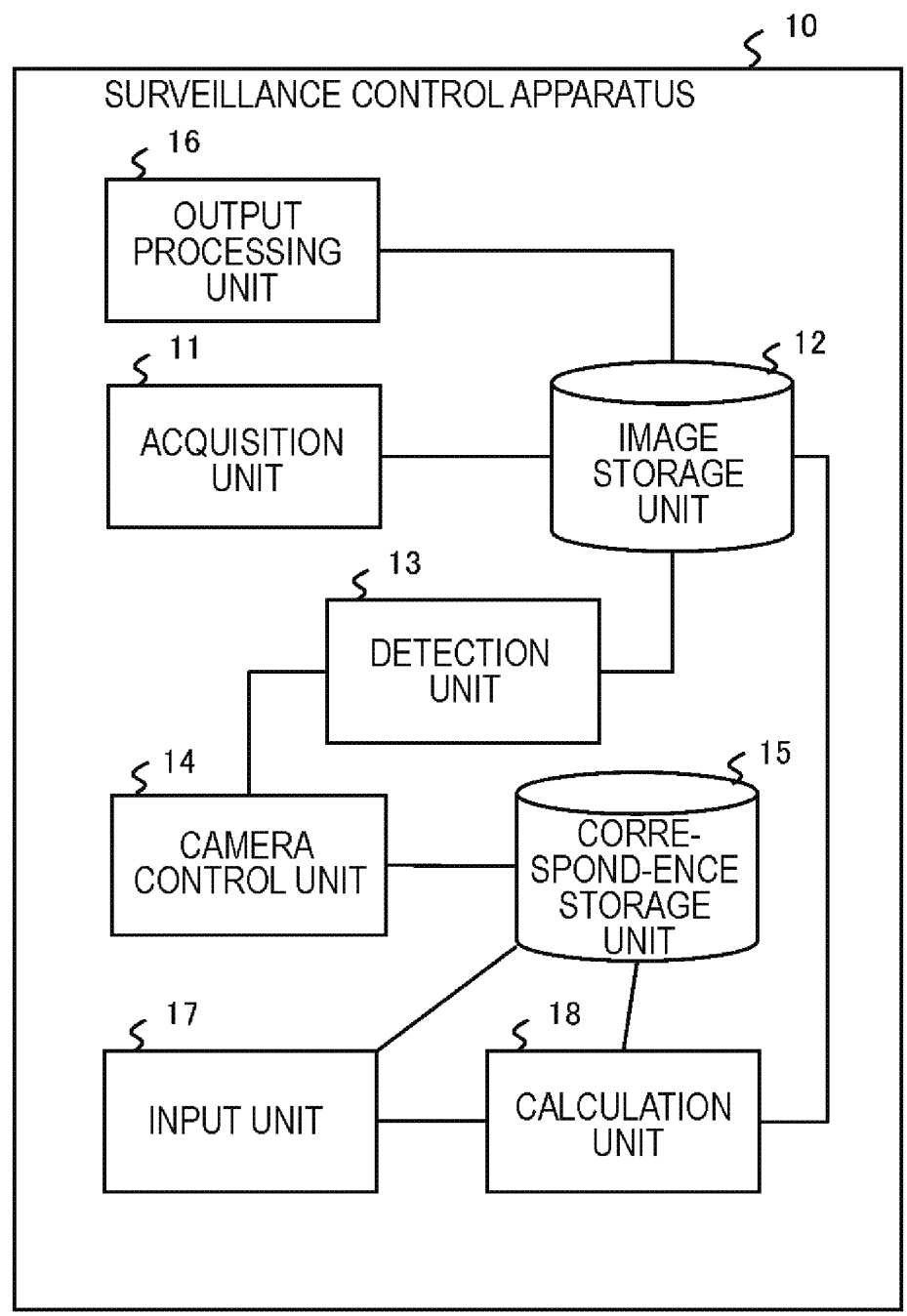
FIG. 2 is a diagram conceptually illustrating a processing configuration example of a surveillance control apparatus according to the first exemplary embodiment.

FIG. 2 is a diagram conceptually illustrating a processing configuration example of the surveillance control apparatus 10 according to the first exemplary embodiment. As shown in FIG. 2, the surveillance control apparatus 10 has an acquisition unit 11, an image storage unit 12, a detection unit 13, a camera control unit 14, a correspondence storage unit 15, an output processing unit 16, an input unit 17, a calculation unit 18, and the like. These processing modules are implemented, for example, by causing the CPU 2 to execute a program stored in the memory 3. Further, the program may be installed from a portable storage medium such as a compact disc (CD) or a memory card or from another computer on the network through the input/output I/F4 or the communication unit 5, and may be stored in the memory 3.

The acquisition unit 11 acquires pieces of image data captured by the respective surveillance cameras 9, from the respective surveillance cameras 9. Specifically, the acquisition unit 11 sequentially acquires the pieces of image data from the video signals which are sent from the respective surveillance cameras 9. At this time, the acquisition unit 11 may acquire the image data by capturing the input video signal at an optional timing. The acquisition unit 11 stores the acquired pieces of image data in the image storage unit 12 in association with the pieces of identification information of the surveillance cameras 9 that capture the images. The acquisition unit 11 acquires the images through the communication unit 5, for example.

The acquisition unit 11 further acquires the camera parameters through which the image capturing direction of the surveillance camera 9 can be specified, stores the camera parameters in the image storage unit 12 further in association with the pieces of image data and the pieces of identification information of the surveillance cameras 9. The camera parameters indicate, for example, the position of the surveillance camera 9, the posture of the surveillance camera 9 such as the image capturing direction, a zoom ratio, and the like (which may include internal parameters), may be acquired from each surveillance camera 9, or may be acquired from the camera control unit 14. Hereinafter, in some cases, the image data may be referred to as an image.

The input unit 17 receives an input of setting of a surveillance position, at which a predetermined event is detected, from the user. The "surveillance position" is defined as an optional static point, line, plane, or space in the common coordinate system or the camera coordinate system. The "surveillance position" is, for example, "the position of the video surveillance line" or "the position of the surveillance region". The common coordinate system is for describing coordinates recognized in common among the plurality of surveillance cameras 9 and among images captured by the surveillance cameras 9. As the common coordinate system, for example, a global positioning system (GPS) coordinate system, a coordinate system defined on a floor map in the facility, or the like can be used. The camera coordinate system is for describing coordinates which are set on an image captured by a certain surveillance camera 9.

That is, the input unit 17 may receive the setting of the surveillance position through the camera coordinate system of the predetermined surveillance camera 9 or may receive the setting through the common coordinate system. In a case where the surveillance position is set in the camera coordinate system, the input unit 17 converts the surveillance position to the common coordinate system on the basis of the above-mentioned camera parameters. Various existing methods can be applied to the conversion between the common coordinate system and the camera coordinate system using camera parameters.

The input unit 17 outputs the received information regarding the common coordinate system at the surveillance position to the calculation unit 18 together with the identification information of the surveillance position. The input unit 17 receives the setting of the surveillance position, which is input through the user's operation performed on the input apparatus 8 shown in FIG. 1, through the input/output I/F4.

Here, the video surveillance line and the surveillance region in the "position of the surveillance line" or the "position of the surveillance region" as a specific example of the surveillance position will be described. The "video surveillance line" is a line which is superimposed on a surveillance image or the like designated by the user, and is a line which is for detecting an object crossing (passing through) the line or coming into contact with the line. The "surveillance region" is a partial region of a surveillance image or the like set by the user, and is a region for detecting a predetermined event. The surveillance region is also known as an area of interest (AOI), a region of interest (ROI), a sensing region, a restricted area, and the like.

Figure 3:
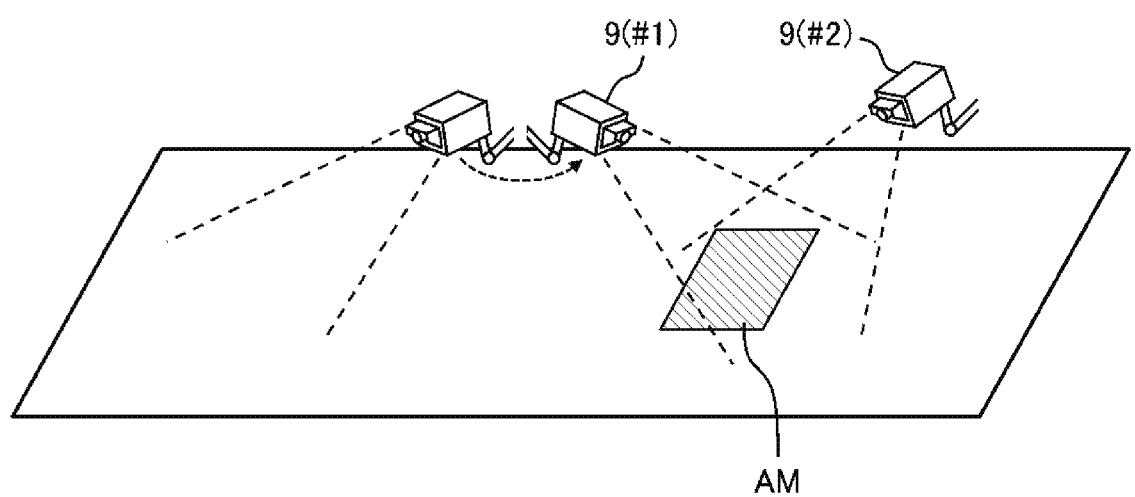
FIG. 3 is a diagram illustrating a relationship between an imaging region of a surveillance camera and a set surveillance region.

FIG. 3 is a diagram illustrating a relationship between the imaging region of the surveillance camera and the set surveillance region. In the example of FIG. 3, the surveillance cameras 9(#1) and 9(#2) are installed such that the imaging regions thereof overlap. Further, the surveillance region AM is set to partially overlap with an imaging region in which two imaging regions overlap. In the example of FIG. 3, the surveillance region AM is set as a plane region on the common coordinate system, that is, a plane region on the floor (ground) in the real world. In the present exemplary embodiment, the surveillance cameras 9 are installed, and the surveillance region AM is set, as shown in FIG. 3.

The calculation unit 18 calculates camera parameters for capturing an image of the surveillance position for each surveillance camera 9 capable of capturing the image of the surveillance position, from the surveillance position which is output from the input unit 17 and is represented by the common coordinate system. The method, by which the calculation unit 18 calculates camera parameters, is not limited, and various existing methods may be used. For example, the correspondence storage unit 15 stores, in advance, a correspondence relationship between the image capturable range of each surveillance camera 9 in the common coordinate system and the camera parameter group for capturing the range, in addition to the stored information to be described later, for each surveillance camera 9. In that case, the calculation unit 18 can determine the camera parameters such that an image of a certain position (surveillance position) on the common coordinate system can be captured using the correspondence relationship stored in the correspondence storage unit 15. The calculation unit 18 may calculate the camera parameters such that an image of the video surveillance line is captured at the center of the angle of view. Further, for example, the calculation unit 18 may calculate the camera parameters such that the ratio of the surveillance region occupying the entire field of view is about a half of the entire region. The calculation unit 18 outputs information to the correspondence storage unit 15. In the information, the following are associated: the identification information (ID) of each surveillance position; the coordinate information of each surveillance position in the common coordinate system; and camera parameters through which an image of the surveillance position of each surveillance camera 9 capable of capturing an image of the surveillance position can be captured.

The detection unit 13 detects a predetermined event in the surveillance position included in the image captured by each surveillance camera 9. The detection unit 13 can specify the surveillance position in the image on the basis of the camera parameters of the surveillance camera 9 at the time of capturing the image and the common coordinates of the surveillance position stored in the correspondence storage unit 15. As the camera parameters of the surveillance camera 9 at the time of capturing the image, camera parameters, which are stored in the image storage unit 12 in association with the image, may be used. For example, the detection unit 13 can convert the camera coordinate system on the image into the common coordinate system, on the basis of the correspondence relationship between the image capturable range of each surveillance camera 9 in the common coordinate system and the camera parameter group for capturing an image of the range, and the camera parameters at the time of capturing the image. For example, as described above, the correspondence relationship is held in the correspondence storage unit 15 in advance. Thereby, the detection unit 13 can determine whether or not the surveillance position is included in the image, from the relationship between the range of the common coordinate system in the image and the common coordinates of the surveillance position. In a case where the surveillance position is included in the image, the detection unit 13 can convert the common coordinates of the surveillance position into the camera coordinates of the surveillance camera 9. The detection unit 13 detects a predetermined event at the surveillance position (surveillance position in the image) represented by the camera coordinate system. However, the method of specifying the surveillance position of the detection unit 13 is not limited.

The predetermined events detected by the detection unit 13 may be various situations to be monitored in the system 1. For example, the detection unit 13 may detect a predetermined situation which is caused by the object as the predetermined event. A "target object" is a part or the whole of a predetermined object which is a person, an animal, a vehicle such as a car, a suitcase, or the like. For example, the predetermined event includes a target object's passing across the video surveillance line, predetermined situations of the target object in the surveillance region (intruding, exiting, appearing, disappearing, fighting, staying, roving, falling down, standing up, crouching down, changing the moving direction, reverse traveling, shoplifting, detouring, damaging, carrying away, leaving behind, painting graffiti, and the like), movement of the target object of a specific route defined by a line segment, and the like.

Further, the detection unit 13 may detect a predetermined situation occurring in a predetermined number of target objects or more, as a predetermined event. The "target object" is as described above. The predetermined situation is a situation that is likely to be caused by the target object, and includes, for example, the above exemplified situations such as passing across the video surveillance line and intruding in the surveillance region. The predetermined event detected in this case may be expressed as an "abnormal state" which is a situation that should be particularly noticed. For example, in a case where the target object is a person, when multiple persons are staying in the surveillance region, a crowd is formed. The detection unit 13 detects the state in which the crowd is formed, as an abnormal state. In particular, the detection unit 13 may detect, as the "abnormal state", a case where the above-mentioned predetermined situation is caused at substantially the same time by a predetermined number of target objects or more. For example, in a case where the target object is a person, when multiple persons crouch down together in the surveillance region, it is considered that an unusual situation such as a situation in which a person is shooting a pistol has suddenly occurred. The detection unit 13 detects a situation in which a large number of persons have crouched down all at once as an abnormal state. Note that the video surveillance line may have direction attributes (right to left, left to right, both directions, and the like), and may be designed such that only a case where there is a target object's passing in the direction specified by a user is detected as a predetermined event. Further, the video surveillance line may be designed such that a case where the number of persons passing across the video surveillance line per unit time is greater than the predetermined number is detected as a predetermined event. Furthermore, the video surveillance line may be designed such that the above state is detected as an abnormal state.

In order to detect a predetermined event, the detection unit 13 detects a target object from the acquired image. The detection unit 13 detects the target object using various existing methods. For example, the detection unit 13 detects a target object from the acquired image by a background differencing technique. In that case, the detection unit 13 constructs a model representing background information from a plurality of images which are input in chronological order, and detects a moving object by using the model. Most simply, the detection unit 13 defines a background image, which is generated by averaging information of a still region of an image among a plurality of frames, as a background model. The detection unit 13 calculates a difference between the target image and the background image, and detects a region having a large difference as the target object. The detection unit 13 may directly perform detection by using a model of the target object such as a person without using the background model. For example, in the case of a person, the model used here may be a model representing the whole person or a model representing a part of a person. For example, the detection unit 13 may detect the face or the head by using a face detector or a head detector which is designed to model and detect the face or the head as a part of a person. Alternatively, the detection unit 13 may detect the target object by using a detector which detects a part of a region of a person such as the upper half of the body or the lower half of the body.

The detection unit 13 detects predetermined events using various existing methods. For example, while tracking the detected target object in a plurality of images, the detection unit 13 may detect a change of the target object to a predetermined state. The predetermined state after the change may be held in advance as an image feature value. A well-known method may be used as the method of tracking the target object in the images and the method of detecting the state change of the target object. Alternatively, the detection unit 13 may detect a predetermined state by using the image feature value of the target object in the predetermined state, thereby detecting an event corresponding to the predetermined state.

The detection unit 13 detects a predetermined event in the surveillance position in the image by converting the common coordinates of the surveillance position, which are stored in the correspondence storage unit 15, into the camera coordinate system. Therefore, when detecting the predetermined event, the detection unit 13 can specify an ID of the surveillance position where the predetermined event or an abnormal state is detected, on the basis of the information stored in the correspondence storage unit 15. For example, the camera control unit 14 to be described later uses the ID of the surveillance position where the predetermined event or the abnormal state is detected.

After the detection unit 13 detects the predetermined event, the camera control unit 14 selects the surveillance camera 9 capable of capturing an image of the surveillance position (for example, the position of the video surveillance line or the position of the surveillance region) among the plurality of surveillance cameras 9, and controls the selected surveillance camera 9 such that it captures an image of the surveillance position where the predetermined event is detected. The camera control unit 14 excludes the unselected surveillance camera 9 from the control targets at the time of detecting the predetermined event. In the present exemplary embodiment, among the plurality of surveillance cameras 9, the camera control unit 14 selects a surveillance camera 9, which is a surveillance camera 9 other than the surveillance camera 9 that has captured an image in which the predetermined event is detected, and is capable of capturing the image of the surveillance position where the predetermined event is detected, as a control target. For example, the camera control unit 14 selects the surveillance camera 9 as the control target with reference to the correspondence relationship information which is stored in the correspondence storage unit 15 exemplified in FIG. 4.

FIG. 4 is a diagram illustrating an example of the correspondence relationship information stored in the correspondence storage unit 15. As exemplified in FIG. 4, the correspondence storage unit 15 stores information indicating a plurality of correspondence relationships of identification information (camera ID) of the surveillance camera 9, identification information of the surveillance position (ID of the surveillance position), common coordinates of the surveillance position, and the camera parameters. The camera parameters, which are included in the correspondence relationship information, indicate parameters for capturing the image of the surveillance position which is specified by the ID of the surveillance position of the surveillance camera 9 specified by the camera ID, and indicate the posture, the zoom value, and the like of the surveillance camera 9. The common coordinates of the surveillance position may be defined by a line segment such as the video surveillance line and a region such as the surveillance region. In a case of the line segment, the common coordinates indicate coordinates of both ends of the line segment. In a case of the region, for example, the common coordinates indicate coordinates of the lower left vertex and the upper right vertex of the region defined as a rectangle. FIG. 4 shows an example in which the common coordinates are set on a map of a certain street and are defined by X axis and Y axis.

The camera control unit 14 acquires the identification information (ID) of the surveillance position where the predetermined event is detected, from the detection unit 13. Alternatively, the camera control unit 14 may specify the ID of the surveillance position where the predetermined event is detected, directly with reference to the correspondence relationship information stored in the correspondence storage unit 15. That is, the camera control unit 14 can specify the ID of the surveillance position by using the camera parameters acquired together with the image captured by the surveillance camera 9(#1). For example, the camera control unit 14 selects parameters, which are closer to the camera parameters acquired together with the image where the predetermined event is detected, from the parameter "01" and the "parameter 02" associated with the ID "001" of the surveillance camera 9(#1). The camera control unit 14 can specify the surveillance position, which is specified by the ID "002" associated with the selected "parameter 02", as the surveillance position where the predetermined event is detected.

When the camera control unit 14 specifies the ID of the surveillance position where the predetermined event is detected, the camera control unit 14 may acquire, from the correspondence storage unit 15, the camera parameters and the ID of a surveillance camera 9 (control target) associated with the specified ID of the surveillance position, other than the surveillance camera 9 which has captured the image where the predetermined event is detected. The camera control unit 14 controls the surveillance camera 9 specified by the acquired ID, by using the acquired camera parameters. As a result of this control, the surveillance camera 9 other than the surveillance camera 9 which has captured the image where the predetermined event is detected, captures an image of the surveillance position where the predetermined event is detected. The camera control unit 14 can control the surveillance camera 9 to be controlled by sending the acquired camera parameters to the surveillance camera 9 such that the camera parameters are set in the surveillance camera 9. Further, the camera control unit 14 may transmit a control signal to the surveillance camera 9 such that the posture or the zoom value indicated by the acquired camera parameters is achieved. The camera control unit 14 may change the image capturing direction of the surveillance camera 9, other parameters (zoom value and the like) of the surveillance camera 9, or both. The specific control method is not limited as long as the surveillance camera 9, which has not captured an image of the surveillance position where the predetermined event has been detected, is controlled so as to capture an image.

The method of selecting a surveillance camera 9 to be controlled and the method of controlling the surveillance camera 9 are not limited to the above examples, and various known methods may be used. In the correspondence storage unit 15, not the camera parameters but other information for enabling the surveillance camera 9 to capture an image of the surveillance position may be associated with the camera ID and the ID of the surveillance position. The correspondence relationship information stored in the correspondence storage unit 15 may be information in which pieces of identification information of the plurality of surveillance cameras 9 capable of capturing images of the same surveillance position are associated with camera parameters for causing the surveillance camera 9 to capture images at the surveillance position.

Further, the correspondence relationship information, which is stored in the correspondence storage unit 15, does not have to include information used for controlling the image capturing direction of the surveillance camera 9 to be controlled. In this case, the camera control unit 14 may control the surveillance camera 9 to be controlled, and may sequentially check the images, which are obtained from the surveillance camera 9 after the control, until the target surveillance position is included therein. When confirming that the surveillance position as a target is included, the camera control unit 14 stops the control of the surveillance camera 9.

The output processing unit 16 causes the display apparatus 7 to display the image which is stored in the image storage unit 12 and is captured by each surveillance camera 9. Further, the output processing unit 16 may cause the display apparatus 7 to display the image acquired by the acquisition unit 11. For example, the output processing unit 16 causes the display apparatus 7 to constantly display the respective images captured by the surveillance cameras 9. In a case where the detection unit 13 detects a predetermined event, the output processing unit 16 may display the image in which the predetermined event is detected, on the display apparatus 7 with emphasis higher than the other images. Further, in a case where a predetermined event is detected, the output processing unit 16 can output to other output apparatuses (such as a printer, an audio output apparatus, and alight emitting diode (LED)) other than the display apparatus 7. In the present exemplary embodiment, the output form of the image captured by each surveillance camera 9 is not limited.

[Operation Example]

Figure 5:
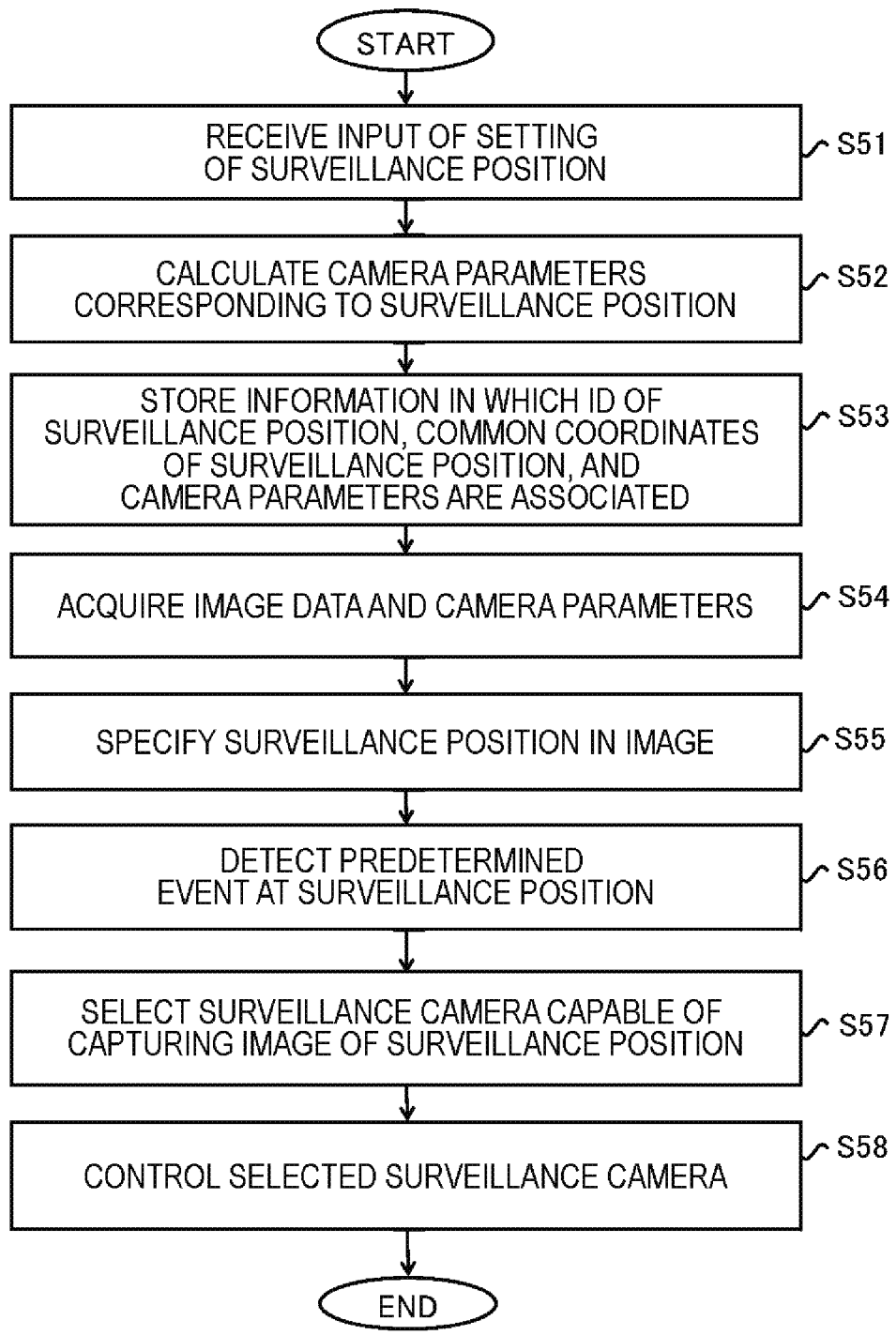
FIG. 5 is a flowchart illustrating an operation example of the surveillance control apparatus according to the first exemplary embodiment.

Hereinafter, the video surveillance method according to a first exemplary embodiment will be described with reference to FIGS. 5 and 6. FIG. 5 is a flowchart illustrating an operation example of the surveillance control apparatus 10 according to the first exemplary embodiment. As shown in FIG. 5, the video surveillance method according to the first exemplary embodiment is executed by at least one computer (CPU 2) such as the surveillance control apparatus 10. Since each step is similar to the processing details of each of the above-mentioned processing modules belonging to the surveillance control apparatus 10, details of each step are appropriately omitted.

The surveillance control apparatus 10 receives an input of surveillance position setting by the user (S51). For example, the surveillance control apparatus 10 receives setting of the surveillance position through the camera coordinate system or the common coordinate system of the predetermined surveillance camera 9. In a case where the surveillance position is set in the camera coordinate system, the surveillance control apparatus 10 converts the surveillance position into the common coordinate system on the basis of the camera parameters of the camera which captures the image in which the camera coordinate system is set.

Subsequently, from the common coordinates of the surveillance position obtained from the input received in (S51), the surveillance control apparatus 10 calculates the camera parameters for capturing an image of the surveillance position, for each surveillance camera 9 that can capture an image of the surveillance position (S52). The calculation method of the camera parameters is as described above.

The surveillance control apparatus 10 determines the ID of the surveillance position with respect to the surveillance position set by the input received in (S51), associates the ID of the surveillance position, the common coordinates of the surveillance position, and the respective camera parameters of surveillance cameras 9 calculated in (S52) with one another, and stores them in the correspondence storage unit 15 (S53). Thereby, in the correspondence storage unit 15, the identification information (ID), the common coordinates, and the camera parameters for performing image capturing through the surveillance camera 9 which can capture an image of the surveillance position are stored in association with one another for the surveillance position input by a user.

The surveillance control apparatus 10 acquires data of the images, which are captured by the respective surveillance cameras 9, from the respective surveillance cameras 9 (S54). The surveillance control apparatus 10 associates the acquired image data with the identification information of the surveillance camera 9 that captures the image, and stores the data in the image storage unit 12. At this time, the surveillance control apparatus 10 further acquires the camera parameters of the surveillance camera 9 that captures the image, and stores the camera parameters in the image storage unit 12 further in association with the image data and the identification information of the surveillance camera 9.

The surveillance control apparatus 10 specifies the surveillance position (for example, the position of the video surveillance line or the position of the surveillance region) in the image acquired in (S51) or the image extracted from the image storage unit 12 (S55). In this specification, the camera parameters acquired in (S54) and the common coordinates of the surveillance position stored in the correspondence storage unit 15 are used. A method of specifying the surveillance position from the image is as described above. The processing of S55 is executed when the PTZ of the surveillance camera is controlled (when the imaging range is changed).

The surveillance control apparatus 10 detects a predetermined event at the surveillance position, which is specified in (S55), (S56). For example, as the predetermined event, the surveillance control apparatus 10 may detect at least one of the target object's passing across the video surveillance line, the predetermined situation of the target object in the surveillance region, and the movement of the target object along the specific route defined by the line segment. Further, the surveillance control apparatus 10 may detect an abnormal state as the predetermined event. The details of the predetermined event and the detection method of the predetermined event are as described above.

When a predetermined event at the surveillance position is detected, the surveillance control apparatus 10 selects the surveillance cameras 9 other than the surveillance camera 9 that has captured the image acquired in (S54), that can capture an image of the surveillance position specified in (S55), among the plurality of surveillance cameras 9 (S57). The selection method of the surveillance camera 9 is also as described above.

The surveillance control apparatus 10 controls the surveillance camera 9, which is selected in (S57), so as to capture an image of the surveillance position, which is specified in (S55), (S58). For example, the surveillance control apparatus 10 changes the image capturing direction of the surveillance camera 9, which is selected in (S57), such that the image of the surveillance position can be captured. The control method of the surveillance camera 9 is also as described above.

Figure 6:
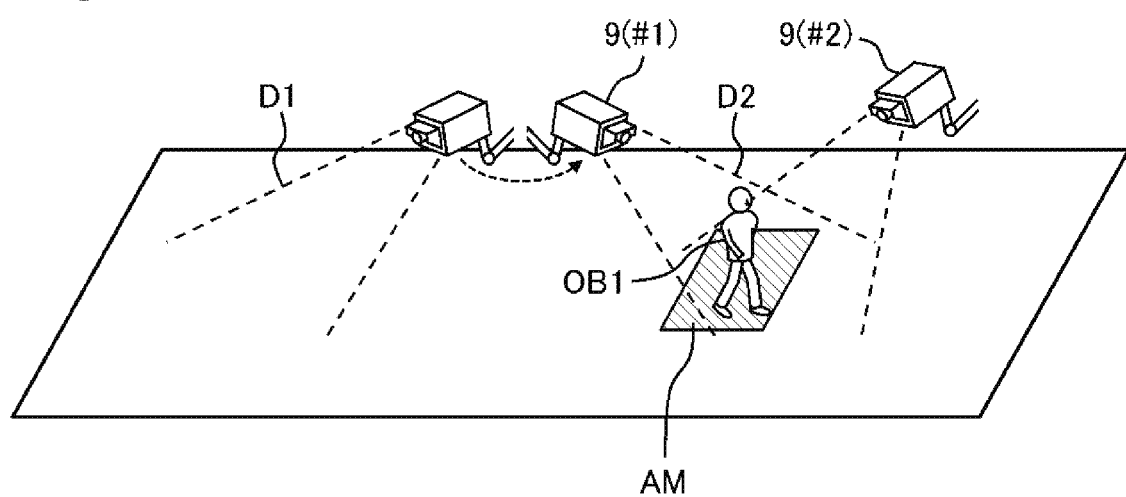
FIG. 6 is a diagram conceptually illustrating an example of control of the surveillance camera.

FIG. 6 is a diagram conceptually illustrating an example of control of the surveillance camera 9. In the example of FIG. 6, the surveillance control apparatus 10 receives an input of setting of the position of the surveillance region AM (S51). This input may be performed by the range designation operation which is performed by a user on the image captured by the surveillance camera 9(#2). The surveillance control apparatus 10 calculates common coordinates of the surveillance region AM. Then, the surveillance control apparatus 10 calculates camera parameters for capturing an image of the position of the surveillance region AM, for each of the surveillance cameras 9(#1) and (#2) that can capture images of the position of the surveillance region AM (S52). In a case where the camera parameters of the surveillance camera 9(#2) are fixed, the surveillance control apparatus 10 may hold the camera parameters in advance. The surveillance control apparatus 10 associates the ID of the position of the surveillance region AM, the common coordinates of the surveillance region, the camera parameters of the surveillance camera 9(#1), and the camera parameters of the surveillance camera 9(#2) with one another, and stores them in the correspondence storage unit 15 (S53).

In (S54), the surveillance control apparatus 10 acquires the data of the image captured by the surveillance camera 9(#2) and the camera parameters at the time of image capturing. In a case where the camera parameters of the surveillance camera 9(#2) are fixed, the surveillance control apparatus 10 may hold the camera parameters in advance. The surveillance control apparatus 10 specifies the position of the surveillance region AM in the image (S55), and detects that a person OB1 intrudes into the position of the surveillance region AM, as a predetermined event (S56). At this time, the surveillance camera 9(#1) is performing image capturing in the image capturing direction D1, and is not performing image capturing of the position of the surveillance region AM. When the predetermined event is detected, the surveillance control apparatus 10 selects the surveillance camera 9(#1) other than the surveillance camera 9(#2) as a surveillance camera capable of capturing an image of the position of the surveillance region AM (S57). Then, the surveillance control apparatus 10 controls the selected surveillance camera 9(#1) such that an image of the position of the surveillance region AM is captured (S58). That is, the surveillance control apparatus 10 controls such that the image capturing direction of the surveillance camera 9(#1) changes from D1 to D2. Thereby, both the surveillance cameras 9(#1) and (#2) capture images of the position of the surveillance region AM, whereby it is possible to obtain the images of the surveillance region AM captured in different directions.

[Advantages and Effects of First Exemplary Embodiment]

As described above, in the first exemplary embodiment, the predetermined event is detected at the surveillance position (for example, the position of the video surveillance line or the position of the surveillance region) included in the image captured by a certain surveillance camera 9. In accordance with this detection, a surveillance camera 9 other than the surveillance camera 9, which has captured the image in which the predetermined event is detected, is controlled so as to capture the image of the predetermined position. Thereby, two or more surveillance cameras 9 capture images at the surveillance position where the predetermined event is detected. Therefore, according to the first exemplary embodiment, it is possible to monitor, in various directions, details of the appearance of the surveillance position (for example, the position of the video surveillance line or the position of the surveillance region) and the appearance of the predetermined event occurring when the predetermined event occurs.

Further, in the first exemplary embodiment, the surveillance camera 9 is controlled in response to the detection of a predetermined event such as the target object's passing across the video surveillance line, a predetermined situation of the target object in the surveillance region, or movement of the target object along the specific route defined by the line segment. Accordingly, compared with the method in which the surveillance cameras are controlled each time a person is detected, the surveillance work can be performed efficiently even in such a scene where a large number of persons come and go or crowds are formed. In addition, in the first exemplary embodiment, it is detected that a predetermined situation is caused by a predetermined number of target objects or more, and the surveillance camera 9 is controlled in response to this detection. With such a configuration, the surveillance camera 9 is controlled only depending on occurrence of an event such as an abnormal state to be particularly noticed. Thus, it is possible to further improve the efficiency of the surveillance work.

Further, in the first exemplary embodiment, like the PTZ camera, a movable surveillance camera 9 is included, and the movable surveillance camera 9 is controlled so as to capture an image of the surveillance position where the predetermined event is detected. Accordingly, by using the movable surveillance camera 9, it is possible to comprehensively monitor a wide area with a small number of surveillance cameras, and it is possible to preferentially monitor the surveillance position such as the position of the video surveillance line or the position of the surveillance region in conjunction with the detection of the predetermined event.

Second Exemplary Embodiment

In the first exemplary embodiment described above, when a predetermined event is detected at a surveillance position in a captured image of a certain surveillance camera 9, another surveillance camera 9 is controlled so as to capture an image of the surveillance position. In the second exemplary embodiment, when an event is detected in a captured image of a certain surveillance camera 9, another surveillance camera 9 is controlled so as to capture an image of a position different from the position where the event is detected. Hereinafter, a video surveillance system 1 according to a second exemplary embodiment will be described focusing on processing details different from those of the first exemplary embodiment. In the following description, processing details the same as those of the first exemplary embodiment will be appropriately omitted.

[Processing Configuration]

The processing configuration of the surveillance control apparatus 10 according to the second exemplary embodiment is the same as that in the first exemplary embodiment (refer to FIG. 2). The processing details to be described below are different from those in the first exemplary embodiment.

The detection unit 13 detects a predetermined event at a predetermined position included in an image captured by a certain surveillance camera 9. The camera control unit 14 controls a different surveillance camera 9 so as to capture an image of a different position corresponding to the predetermined position where the detection unit 13 has detected the predetermined event. Hereinafter, the predetermined position, which is for detecting the predetermined event from the image of the certain surveillance camera 9, is referred to as a "detection target position", and the position, which is monitored by one or more different controlled surveillance cameras 9, is referred to as "the surveillance target position". That is, the detection unit 13 detects the predetermined event at the detection target position which is included in the image captured by the certain surveillance camera 9 and is different from the surveillance target position. The "detection target position" is a position predetermined for detecting the predetermined event, and is a position of which at least one surveillance camera 9 can capture an image. The "surveillance target position" is a position to be monitored which is set in association with one or more "detection target positions", and is a position where at least one surveillance camera 9 can perform image capturing. The "detection target position" and the "surveillance target position" are set as arbitrary static points, lines, planes, or spaces in the real world. The "detection target position" corresponds to, for example, the "position of the video surveillance line" or the "position of the surveillance region" in the first exemplary embodiment. The "surveillance target position" is an arbitrary position of a line segment or a region. Individual common coordinates of the detection target position and the surveillance target position are acquired from the user input which is received through the input unit 17. In the second exemplary embodiment, the correspondence storage unit 15 stores correspondence relationships of the ID of the detection target position, the common coordinates of the detection target position, the ID of the surveillance target position corresponding to the detection target position, and camera parameters for capturing an image of the surveillance target position for each surveillance camera 9 capable of capturing an image of the surveillance target position.

The predetermined event, which is detected by the detection unit 13, is as described above. However, since the surveillance target position is monitored under the control of the surveillance camera 9, occurrence of the predetermined event at the detection target position becomes a trigger (priming) that is necessary for monitoring the surveillance target position. Therefore, for example, on the basis of such a relationship, the detection target position with respect to the surveillance target position and the processing details of the predetermined event to be detected are determined. For example, the detection target position is set as a position where a person heading for the surveillance target position is highly likely to pass. In this case, the detection unit 13 detects a state (person passing across the video surveillance line in a predetermined direction), in which the person moves toward the surveillance target position, and a state, in which a person stays, as the predetermined event, at the detection target position. As another example, the surveillance target position is set as a region along a rail track of a certain station platform, and the detection target position is set as a part of the rail track around the station. In this case, the detection unit 13 detects a state, in which the train moves toward the surveillance target position (station), as a predetermined event, at the detection target position. In the subsequent control, for example, the surveillance camera 9, which is installed on the platform so as to be monitoring the escalator, is controlled to monitor the region along the rail track as the surveillance target position. The surveillance target position, the detection target position, and the types of the predetermined event to be detected are not limited to the examples described above.

The detection unit 13 can specify the detection target position in the image in the same manner as the surveillance position in the first exemplary embodiment. The detection unit 13 detects a predetermined event in the detection target position in the image by converting the common coordinates of the detection target position, which is stored in the correspondence storage unit 15, into the camera coordinate system. Accordingly, when detecting the predetermined event, the detection unit 13 can specify the ID of the detection target for which the predetermined event was detected, on the basis of the information stored in the correspondence storage unit 15. The ID of the detection target position, in which the predetermined event is detected, is used by, for example, the camera control unit 14 to be described later.

Figure 7:
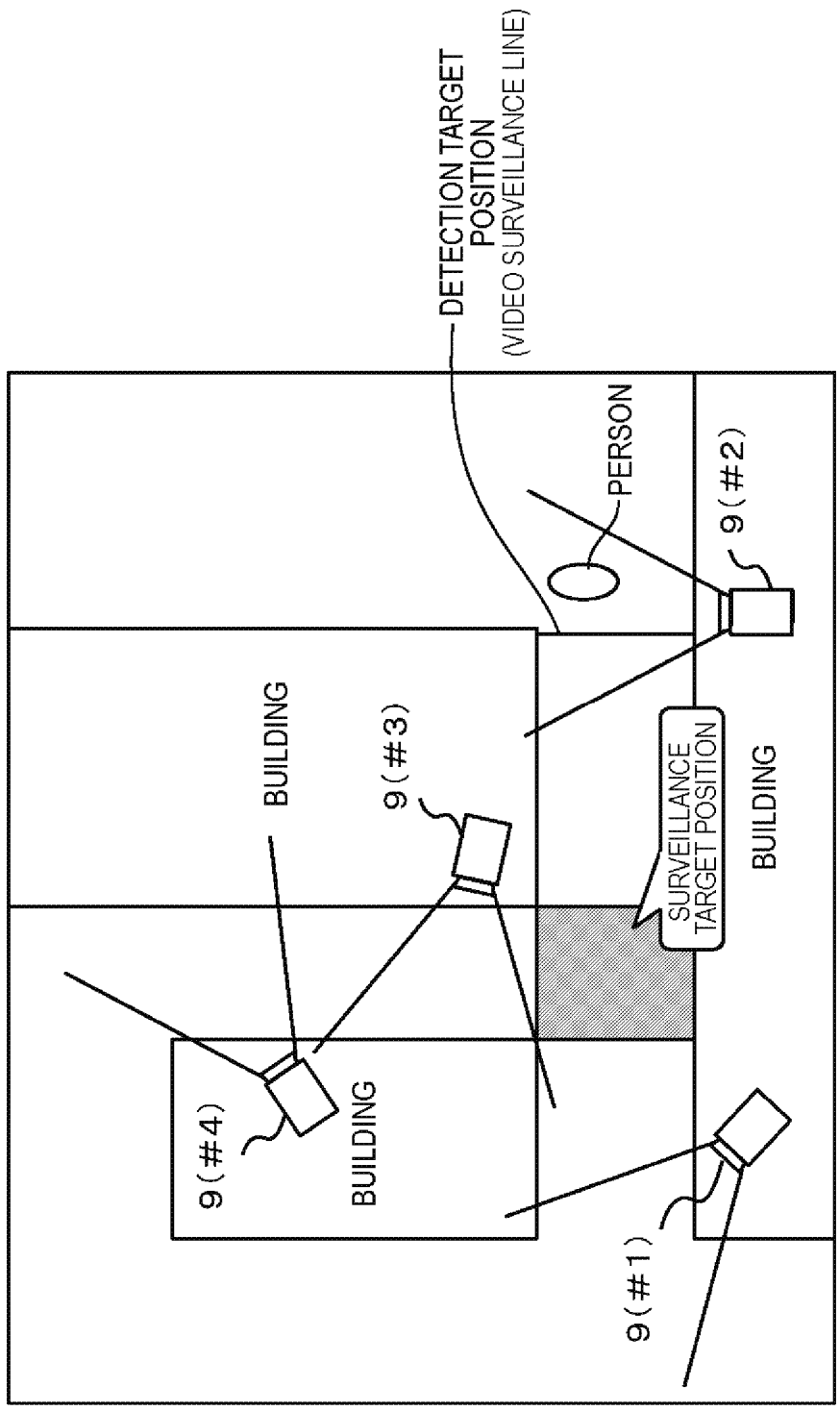
FIG. 7 is a diagram illustrating a relationship between the imaging region, a surveillance target position, and a detection target position of the surveillance camera.

FIG. 7 is a diagram illustrating a relationship between the imaging region of the surveillance camera, the surveillance target position, and the detection target position. In the example of FIG. 7, the surveillance target position is set as a plane region on the floor (ground) in the real world, and the detection target position is set as a line segment on the floor (ground) in the real world. The surveillance camera 9(#1), the surveillance camera 9(#3), and the surveillance camera 9(#4) can capture an image of the surveillance target position, and the surveillance camera 9(#2) can capture an image of the detection target position. In this case, the detection unit 13 detects a predetermined event at the detection target position included in the image captured by the surveillance camera 9(#2).

The correspondence storage unit 15 stores correspondence relationship information as follows. The correspondence storage unit 15 stores a plurality of pieces of correspondence relationship information of the identification information of the surveillance camera 9, the identification information of the detection target position of which the surveillance camera 9 can capture an image, the common coordinates of the detection target position, the identification information of the surveillance target position corresponding to the detection target position, and the camera parameters for capturing an image of the surveillance target position with the surveillance camera 9.

FIG. 8 is a diagram illustrating an example of the correspondence relationship information stored in the correspondence storage unit 15. In the example of FIG. 8, the correspondence relationship information, which is stored in the correspondence storage unit 15, indicates a plurality of correspondence relationships of the camera ID of the surveillance camera 9, the ID of the detection target position, the common coordinates of the detection target position, the ID of the surveillance target position corresponding to the detection target position, and the camera parameters for causing the surveillance camera 9 to capture an image of the surveillance target position. The camera parameters indicate parameters for causing the surveillance camera 9 specified by the camera ID to capture an image of the surveillance target position specified by the ID of the surveillance target position, and indicate the posture, the zoom value, and the like of the surveillance camera 9.

According to the example of FIG. 8, it can be seen that a surveillance camera 9 with a camera ID "001" can capture images of both a detection target position "001" and a corresponding surveillance target position "001". It can be seen that a surveillance camera 9 with a camera ID "002" can capture an image of the surveillance target position "001". Further, it can be seen that a surveillance camera 9 with a camera ID "003" can capture the surveillance target position "001" and a detection target position "002" and cannot capture an image of a surveillance target position "002" corresponding to the detection target position "002" (which can be recognized from a situation where a camera parameter "03" for capturing an image of the surveillance target position "001" and common coordinates of the detection target position "002" are held but camera parameters for capturing an image of the surveillance target position "002" are not held). It can be seen that a surveillance camera 9 with a camera ID "004" can capture an image of a surveillance target position "002". As described above, the information, which is stored in the correspondence storage unit 15, is stored by receiving user's setting of the detection target position and the surveillance target position from the input unit. The calculation unit 18 calculates camera parameters, through which an image of the surveillance target position can be captured, for each surveillance camera 9, on the basis of the common coordinates of the surveillance target position which is input by a user.

The camera control unit 14 refers to the pieces of correspondence relationship information, which are stored in the correspondence storage unit 15, after the detection unit 13 detects a predetermined event, thereby specifying the surveillance camera 9 capable of capturing an image of the predetermined surveillance target position corresponding to the predetermined detection target position where the predetermined event is detected.

For example, as described above, the camera control unit 14 acquires the identification information (ID) of the detection target position where the predetermined event is detected from the detection unit 13. On the basis of the correspondence relationship information stored in the correspondence storage unit 15, the camera control unit 14 specifies the identification information (ID) of the surveillance target position corresponding to the acquired ID of the detection target position and the camera ID of the surveillance camera 9 capable of capturing an image of the surveillance target position. The camera control unit 14 can acquire the camera parameters, through which an image of the surveillance target position can be captured, for each camera ID of the specified surveillance camera 9. Here, in the example of FIG. 8, it is assumed that a predetermined event is detected at the detection target position specified by the ID "001" of the detection target position of the surveillance camera 9 specified by the camera ID "001". In this case, the camera control unit 14 acquires the ID "001" of the surveillance target position corresponding to the detection target position ID "001", and further acquires the camera IDs "001", "002", and "003" of the surveillance cameras corresponding to the ID "001" of the surveillance target position. Further, the camera control unit 14 acquires the camera parameters for each acquired camera ID. The camera control unit 14 controls the surveillance camera 9, which is specified by the acquired ID, by using the acquired camera parameters. For example, the camera control unit 14 controls the surveillance camera 9 with the camera ID "001" by using the camera parameter "01", controls the surveillance camera 9 with the camera ID "002" by using the camera parameter "02", and controls the surveillance camera 9 of the camera ID "003" by using the camera parameter "03". In this example, the surveillance camera 9 with the camera ID "001" itself, which has acquired the image where the predetermined event is detected, is also controlled to face toward the surveillance target position.

[Operation Example]

Figure 9:
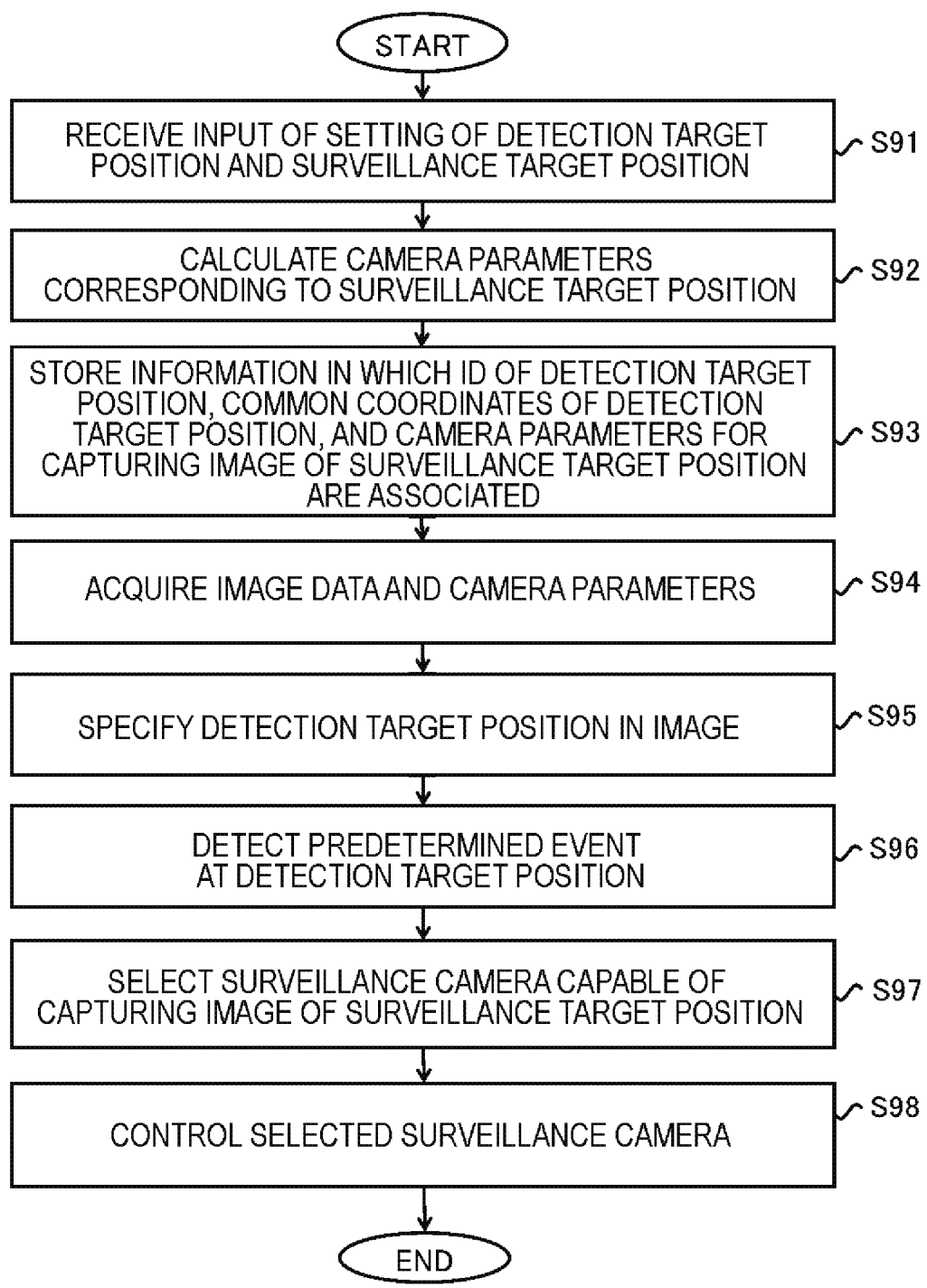
FIG. 9 is a flowchart illustrating an operation example of a surveillance control apparatus according to a second exemplary embodiment.

Hereinafter, the video surveillance method according to a second exemplary embodiment will be described with reference to FIGS. 9 and 10. FIG. 9 is a flowchart illustrating an operation example of the surveillance control apparatus 10 according to the second exemplary embodiment. As shown in FIG. 9, the video surveillance method according to the second exemplary embodiment is executed by at least one computer (CPU 2) such as the surveillance control apparatus 10. Since each step is similar to the processing details of each of the above-mentioned processing modules belonging to the surveillance control apparatus 10, details of each step are appropriately omitted.

The surveillance control apparatus 10 receives an input of setting of the detection target position and the surveillance target position from a user (S91). For example, the surveillance control apparatus 10 receives the setting of the detection target position and the surveillance target position in the camera coordinate system of the predetermined surveillance camera 9 or the common coordinate system. When the detection target position and the surveillance target position are set in the camera coordinate system, the surveillance control apparatus 10 converts each of the detection target position and the surveillance target position to the common coordinate system, on the basis of the camera parameters of the camera that has captured the image for which the camera coordinate system is set.

Subsequently, from the common coordinates of the surveillance target position obtained from the input received in (S91), the surveillance control apparatus 10 calculates the camera parameters for capturing an image of the surveillance target position, for each surveillance camera 9 that can capture an image of the surveillance target position (S92). The calculation method of the camera parameters is as described in the first exemplary embodiment.

The surveillance control apparatus 10 determines the IDs of the detection target position and the surveillance target position with respect to the detection target position and the surveillance target position which are set through the input received in (S91), associates the ID of the detection target position and the surveillance target position, the common coordinates of the detection target position, and the camera parameters of each of the surveillance cameras 9 calculated in (S92), and stores them in the correspondence storage unit 15 (S93). Thus, the correspondence storage unit 15 stores the correspondence relationship between the detection target position and the surveillance target position which is input from a user, the common coordinates of the detection target position, and the camera parameters for causing the surveillance camera 9, which can capture an image of the surveillance target position corresponding to the detection target position, to perform image capturing.

The surveillance control apparatus 10 acquires pieces of image data, which are captured by the respective surveillance cameras 9, from the respective surveillance cameras 9 (S94). The surveillance control apparatus 10 stores the acquired pieces of image data in the image storage unit 12 in association with the pieces of identification information of the surveillance cameras 9 that capture the images. At this time, the surveillance control apparatus 10 further acquires the camera parameters of the surveillance camera 9 that has captured the image, and stores the camera parameters in the image storage unit 12 further in association with the image data and the identification information of the surveillance camera 9.

The surveillance control apparatus 10 specifies the detection target position which is set in (S91) in the image acquired in (S94) or in the image extracted from the image storage unit 12 (S95). In this specification, the camera parameters acquired in (S94) and the common coordinates of the detection target position stored in the correspondence storage unit 15 are used. A method of specifying the detection target position from the image is the same as the method of specifying the surveillance position according to the first exemplary embodiment. The processing of S95 is executed when the PTZ of the surveillance camera is controlled (when the imaging range is changed).

The surveillance control apparatus 10 detects a predetermined event at the detection target position, which is specified in (S95), (S96). For example, as the predetermined event, the surveillance control apparatus 10 may detect at least one of the target object's passing across the video surveillance line, the predetermined situation of the target object in the surveillance region, and the movement of the target object along the specific route defined by the line segment. Further, the surveillance control apparatus 10 may detect an abnormal state as the predetermined event. The details of the predetermined event and the detection method of the predetermined event are as described in the first exemplary embodiment.

When a predetermined event at the detection target position is detected, the surveillance control apparatus 10 selects the surveillance camera 9 that can capture an image of the surveillance target position corresponding to the detection target position specified in (S95), among the plurality of surveillance cameras 9 (S97). The selection method of the surveillance camera 9 is also as described above.

The surveillance control apparatus 10 controls the surveillance camera 9, which is selected in (S97), so as to capture an image of the surveillance target position corresponding to the detection target position, which is specified in (S95), (S98). For example, the surveillance control apparatus 10 changes the of image capturing direction of the surveillance camera 9, which is selected in (S97), such that the image of the surveillance target position can be captured. The control method of the surveillance camera 9 is also as described above.

Figure 10:
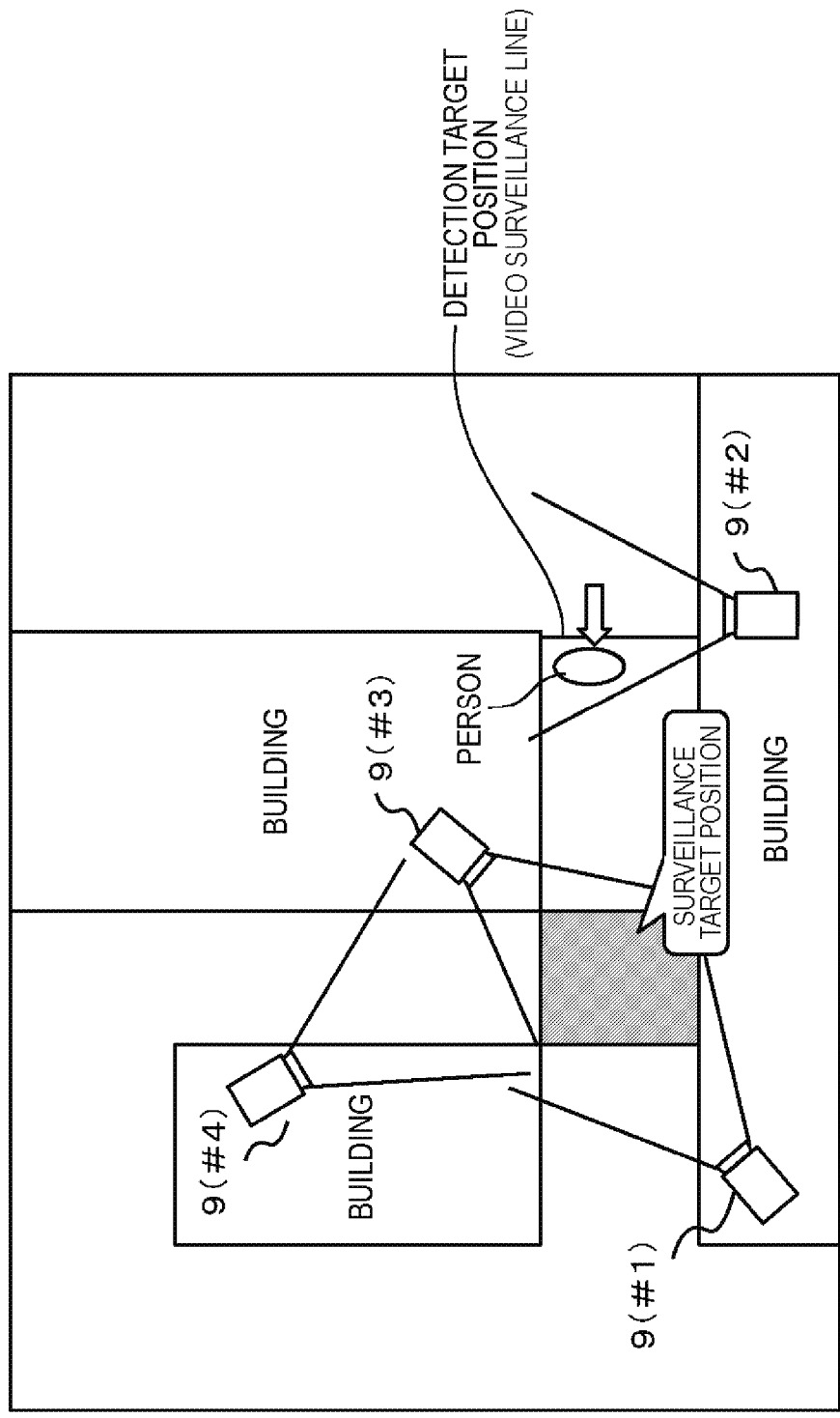
FIG. 10 is a diagram conceptually illustrating an example of control of the surveillance camera.

FIG. 10 is a diagram conceptually illustrating an example of control of the surveillance camera 9. The surveillance control apparatus 10 receives an input of setting of the detection target position (video surveillance line) and the surveillance target position (S91). This input may be performed by the line designation operation and the range designation operation, which are performed by a user, on the respective images captured by the respective surveillance cameras 9. The surveillance control apparatus 10 calculates common coordinates of the detection target position and the surveillance target position. Then, the surveillance control apparatus 10 calculates camera parameters for capturing an image of the position of the surveillance target position, for each of the surveillance cameras 9(#1), 9(#3), and 9(#4) that can capture images of the surveillance target position (S92). In a case where the camera parameters of any one of certain surveillance cameras 9 are fixed, the surveillance control apparatus 10 may hold the camera parameters in advance.

The surveillance control apparatus 10 stores the correspondence relationship information in the correspondence storage unit 15 (S93), as described below. For the surveillance camera 9(#2), the surveillance control apparatus 10 stores correspondence relationship information among the camera ID, the ID of the detection target position (video surveillance line), and the ID of the surveillance target position corresponding to the detection target position. For the surveillance camera 9(#1), the surveillance control apparatus 10 stores correspondence relationship information among the camera ID, the ID of the surveillance target position, and the camera parameters for capturing an image of the surveillance target position. In a case of the surveillance camera 9(#3), the surveillance control apparatus 10 stores correspondence relationship information among the camera ID, the ID of the surveillance target position, and camera parameters for capturing an image of the surveillance target position. For the surveillance camera 9(#4), the surveillance control apparatus 10 stores correspondence relationship information among the camera ID, the ID of the surveillance target position, and camera parameters for capturing an image of the surveillance target position.

In (S94), the surveillance control apparatus 10 acquires the data of the image captured by the surveillance camera 9(#2) and the camera parameters at the time of image capturing. In a case where the camera parameters of the surveillance camera 9(#2) are fixed, the surveillance control apparatus 10 may hold the camera parameters in advance. The surveillance control apparatus 10 specifies the detection target position (video surveillance line) in the image (S95), and detects a person's passing across the video surveillance line, as a predetermined event (S96). At this time, as shown in FIG. 7, it is assumed that the surveillance cameras 9(#1), 9(#3), and 9(#4) have not captured images of the surveillance target position.

When detecting a predetermined event, the surveillance control apparatus 10 selects the surveillance cameras 9(#1), 9(#3), and 9(#4) as surveillance cameras capable of capturing an image of the surveillance target position corresponding to the detection target position, on the basis of the correspondence relationship information stored in the correspondence storage unit 15 (S97). Then, the surveillance control apparatus 10 controls the selected surveillance cameras 9(#1), 9(#3), and 9(#4) so as to capture images of the surveillance target positions by using the camera parameters included in respective pieces of correspondence relationship information (S98). Thereby, as shown in FIG. 10, the surveillance cameras 9(#1), 9(#3), and 9(#4) capture images of the surveillance target position.

[Advantages and Effects of Second Exemplary Embodiment]

As described above, in the second exemplary embodiment, the detection target position and the surveillance target position indicating different positions are acquired according to the user input, and the predetermined event is detected at the detection target position in the captured image of a certain surveillance camera 9. Thus, another surveillance camera 9 is controlled such that an image of the surveillance target position corresponding to the detection target position at which the predetermined event is detected is captured.

According to the second exemplary embodiment, for example, a precursor of something occurring at the surveillance target position is recognized through detection of the predetermined event at the detection target position, and the surveillance target position is set under surveillance at the stage of the precursor. For example, it is assumed that the video surveillance line is set on a path leading to the escalator and setting is made such that an event of an abnormal state occurring is detected in a case where the number of persons passing per unit time is greater than a predetermined number. The surveillance control apparatus 10 according to the second exemplary embodiment recognizes a precursor of occurrence of an accident through detection of such an event, gives a warning, and controls the plurality of surveillance cameras 9, which are installed around the escalator, such that surveillance is performed focusing on the entrance of the escalator. In such a manner, by controlling the surveillance camera 9 before anything happens at the surveillance target position, it is possible to reliably monitor a situation occurring at the surveillance target position without failing.

[Modification Example]

In the above-mentioned first exemplary embodiment, from the common coordinates of the surveillance position which is output from the input unit 17, camera parameters for capturing an image of the surveillance position are automatically calculated, for each surveillance camera 9 capable of capturing an image of the surveillance position (calculation unit 18). Then, the correspondence storage unit 15 stores the identification information (ID), the coordinate information of the common coordinate system, and the camera parameters for each surveillance position. However, in the above-mentioned first exemplary embodiment, the common coordinates of the surveillance position do not have to be used.

For example, an input of setting of a single surveillance position of which images can be captured by two movable surveillance cameras 9 is received through the input unit 17. In this case, a user performs an operation of specifying the surveillance position for each of the images captured by the two surveillance cameras 9. The input unit 17 acquires the camera coordinate information (coordinates in the image) of the surveillance position specified by the user input for the image of the one surveillance camera 9 and the camera parameters at the time of capturing the image. Further, the input unit 17 acquires the camera coordinate information (coordinates in the image) of the surveillance position specified by the user input to the image of the other surveillance camera 9 and the camera parameter at the time of imaging the image. The correspondence storage unit 15 stores the ID of the surveillance position, the camera IDs of the two surveillance cameras 9, the camera parameters for each surveillance camera 9 for capturing an image of the surveillance position, and the camera coordinate information on the surveillance position in association with one another. By using the stored information, the detection unit 13 can detect a predetermined event in the surveillance position for each of the images of the surveillance cameras 9. In this case, the change of the camera parameters of each of the movable surveillance cameras 9 is allowed to be in the range included in the camera parameters stored in the correspondence storage unit 15. By using the stored information, the camera control unit 14 can control the respective surveillance cameras 9 such that the cameras capture images of the surveillance position where the predetermined event is detected.

The second exemplary embodiment can be modified in a similar manner. That is, in the second exemplary embodiment, the common coordinates of the detection target position and the surveillance target position do not have to be used. In this case, the input unit 17 acquires the camera parameters of each surveillance camera 9 when an image of the surveillance target position is captured. Further, the input unit 17 acquires the camera coordinate information (coordinates in the image) of the detection target position, for each of the surveillance cameras 9 that can capture an image of the detection target position, and further acquires information in which the detection target position and the surveillance target position are associated. The correspondence storage unit 15 stores the correspondence relationship (the pair of IDs) between the detection target position and the surveillance target position, and the correspondence relationship information between the camera ID of the surveillance camera 9 that can capture an image of the detection target position or the surveillance target position and the camera parameters for capturing an image of the surveillance target position.

Further, in a case where a user inputs the setting of the position of the surveillance region, the input unit 17 may acquire the image feature value of the surveillance region, instead of the coordinate information of the surveillance region. In this case, the detection unit 13 detects a region similar in the image feature value to the surveillance region in the acquired image, and specifies the detected region as the surveillance region. In that case, the correspondence storage unit 15 may store the image feature value of the surveillance region input by the user.

Third Exemplary Embodiment

Hereinafter, the video surveillance system and the video surveillance method according to a third exemplary embodiment will be described with reference to FIGS. 11, 12, and 13. Further, the third exemplary embodiment may be a program which causes at least one computer to execute this video surveillance method, and also may be a storage medium in which such a program is recorded and which can be read by the at least one computer.

Figure 11:
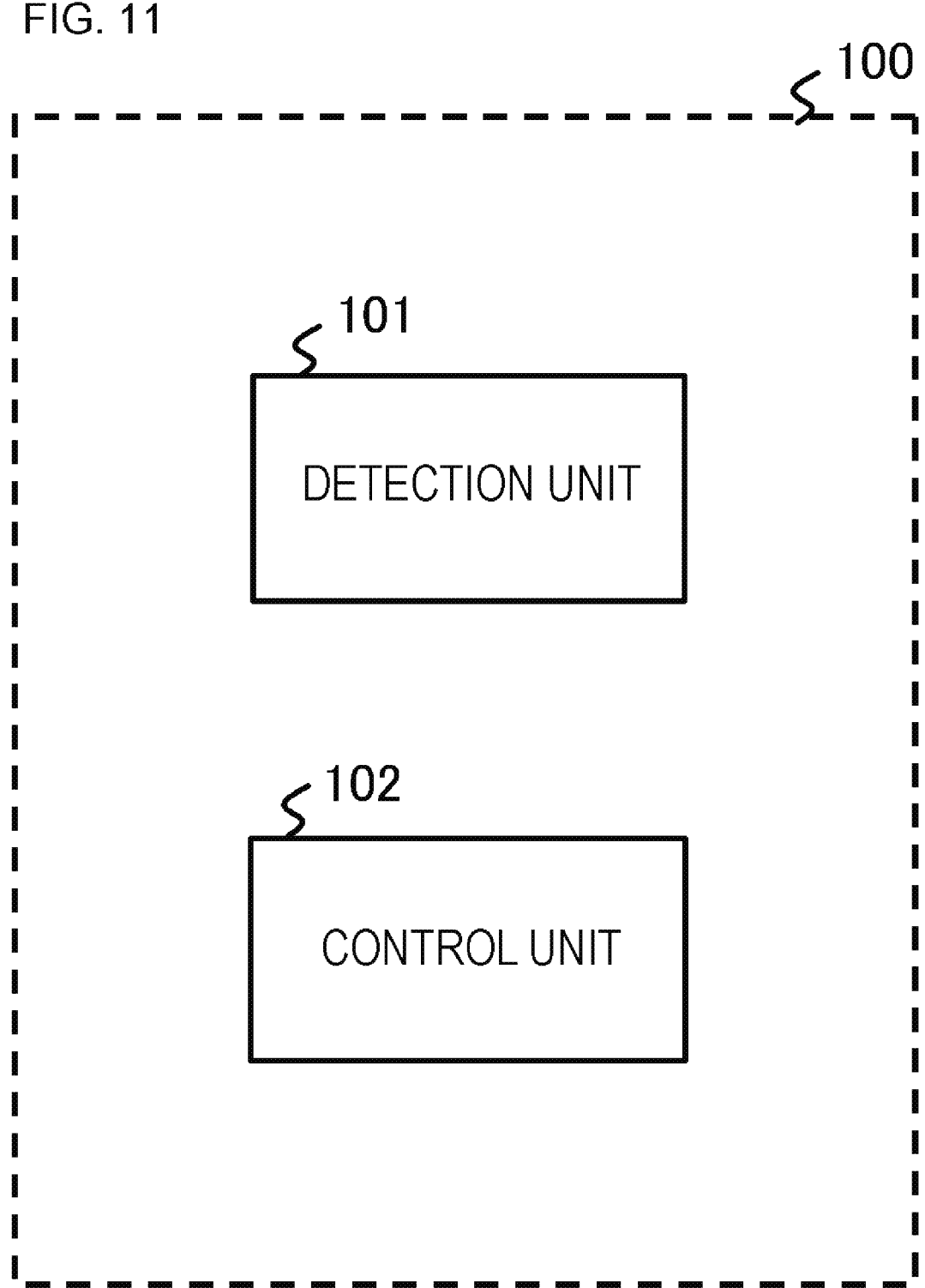
FIG. 11 is a diagram conceptually illustrating a processing configuration example of a video surveillance system according to a third exemplary embodiment.

FIG. 11 is a diagram conceptually illustrating a processing configuration example of a video surveillance system 100 according to a third exemplary embodiment. As shown in FIG. 11, the video surveillance system 100 includes a detection unit 101 and a control unit 102. The video surveillance system 100 shown in FIG. 11 can be realized as the above-mentioned surveillance control apparatus 10 shown in FIG. 1. In this case, the video surveillance system 100 has the same hardware configuration as the surveillance control apparatus 10 shown in FIG. 1.

Figure 12:
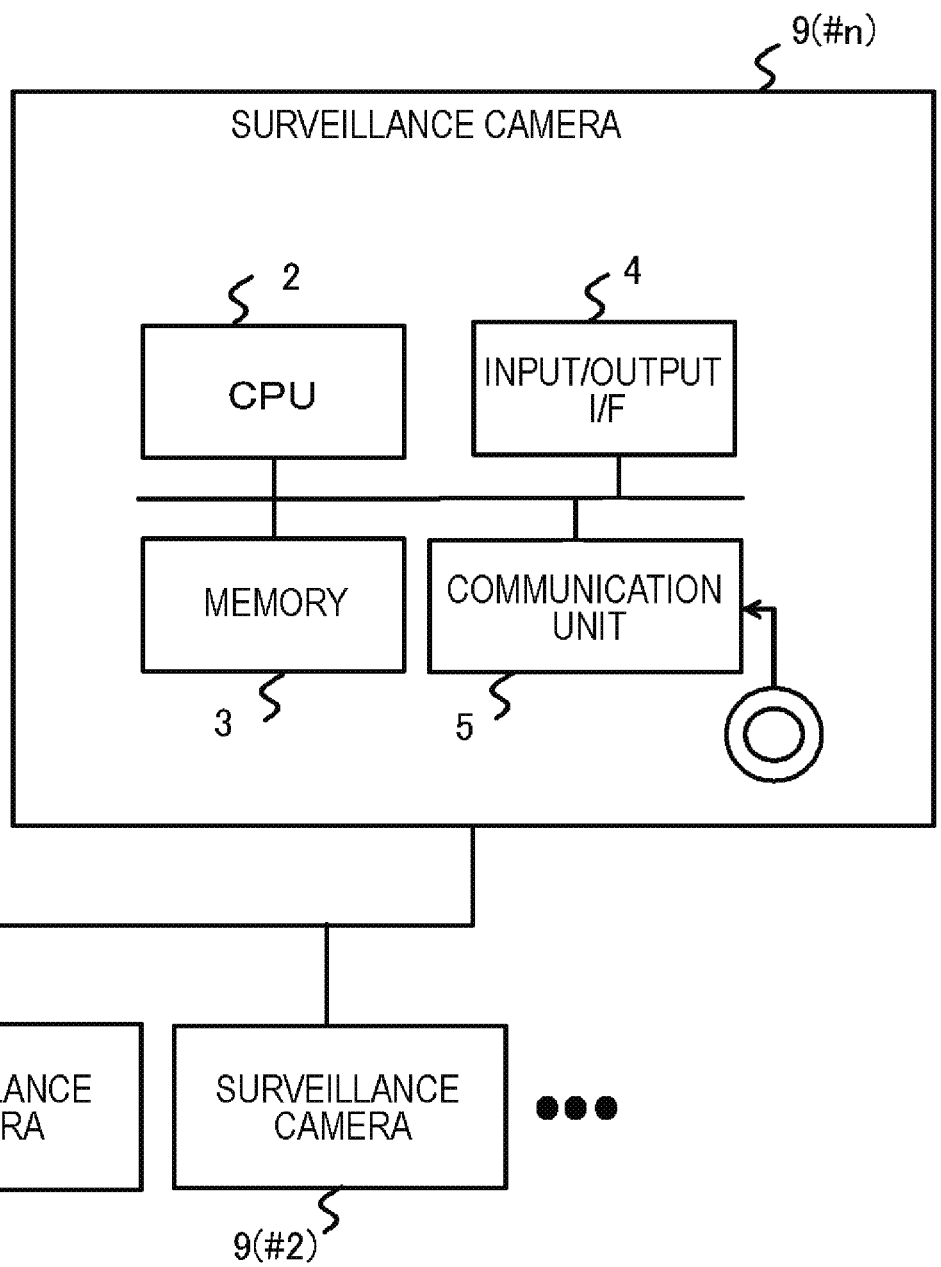
FIG. 12 is a diagram conceptually illustrating a hardware configuration example of the video surveillance system according to the third exemplary embodiment.

FIG. 12 is a diagram conceptually illustrating a hardware configuration example of the video surveillance system 100 according to the third exemplary embodiment. As shown in FIG. 12, the video surveillance system 100 may be realized as a surveillance camera 9(#n). In this case, the video surveillance system 100 (the surveillance camera 9(#n)) has the CPU 2, the memory 3, the input/output interface (I/F) 4, the communication unit 5, and the like, and the surveillance camera 9(#n) controls itself and the other surveillance cameras 9. In this case, the surveillance camera 9(#n) is a so-called intelligent camera. The hardware configuration of the video surveillance system 100 according to the third exemplary embodiment is not limited to the examples in FIGS. 1 and 12, and the video surveillance system 100 may be realized by both the surveillance control apparatus 10 and the surveillance camera 9(#n).

The detection unit 101 and the control unit 102 are realized, for example, by causing the CPU 2 to execute a program stored in the memory 3. Further, the program may be installed from a portable storage medium such as a CD or a memory card or from another computer on the network through the input/output I/F 4 or the communication unit 5, and may be stored in the memory 3. In a case where the video surveillance system 100 is realized by both the surveillance control apparatus 10 and the surveillance camera 9(#n), the detection unit 101 may be realized by the surveillance control apparatus 10, and the control unit 102 may be realized by the surveillance camera 9(#2).

The detection unit 101 detects a predetermined event on the basis of the image captured by a first imaging apparatus (for example, the surveillance camera 9(#2)). The detection unit 101 corresponds to the above-mentioned detection unit 13. The types of the predetermined event and the method of detecting the predetermined event are as described above, and are not limited. Further, the first imaging apparatus may be a fixed surveillance camera 9 and may be a movable surveillance camera 9.

After the detection unit 101 detects the predetermined event, the control unit 102 controls the second imaging apparatus such that the second imaging apparatus (for example, the surveillance camera 9(#1)) captures an image of the predetermined position. The "predetermined position" is a predetermined surveillance position, and is set to an arbitrary static point, line, plane or space in the real world. The control unit 102 corresponds to the above-mentioned camera control unit 14. The control method of the second imaging apparatus is as described above, and is not limited.

As shown in FIG. 11, the video surveillance system 100 according to the third exemplary embodiment does not have to have the acquisition unit 11, the image storage unit 12, the correspondence storage unit 15, and the output processing unit 16 shown in FIG. 2. These processing modules, which are not provided in the video surveillance system 100, are provided by a different computer, and the video surveillance system 100 can cooperate with these processing modules by communicating with the different computer.

Figure 13:
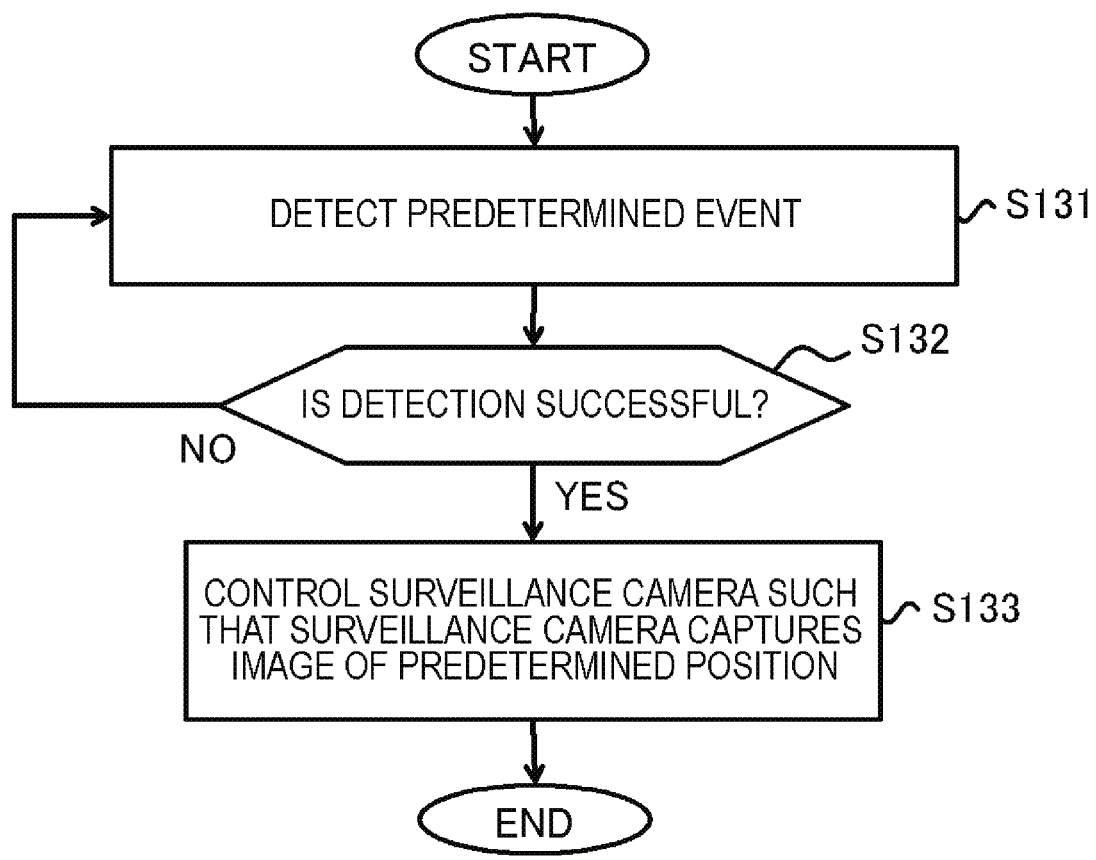
FIG. 13 is a flowchart illustrating an operation example of the video surveillance system according to the third exemplary embodiment.

FIG. 13 is a flowchart illustrating an operation example of the video surveillance system 100 according to the third exemplary embodiment. As shown in FIG. 13, the video surveillance method according to the third exemplary embodiment is executed by at least one computer such as the video surveillance system 100. For example, each step shown in the drawing is executed by each processing module of the video surveillance system 100.

The video surveillance method according to the present exemplary embodiment includes detecting a predetermined event on the basis of the image captured by the first imaging apparatus (for example, the surveillance camera 9 (#2)) (S131), and after detection of a predetermined event (S132; YES), controlling the second imaging apparatus (for example, the surveillance camera 9 (#1)) such that the second imaging apparatus image the predetermined position (S133).

According to the third exemplary embodiment, it is possible to obtain the same advantageous effects as those of the first exemplary embodiment and the second exemplary embodiment described above.

[Example]

Hereinafter, application examples of the video surveillance systems 1 and 100 (hereinafter collectively indicated by the reference numeral 1) according to the above-mentioned exemplary embodiments will be described. However, the above-mentioned application of each exemplary embodiment is not limited to the following example.

Figure 14:
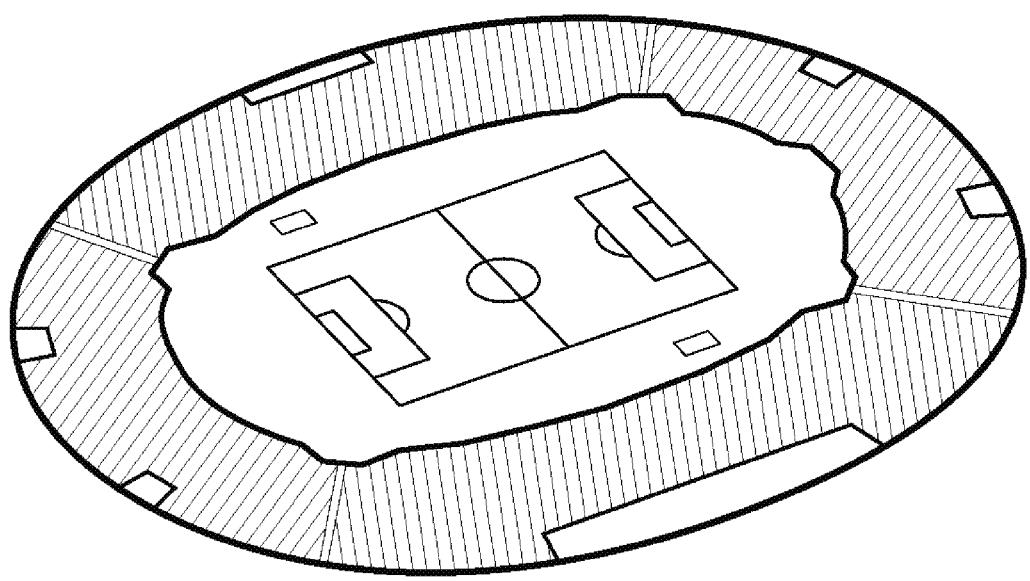
FIG. 14 is a conceptual diagram of a stadium to which a video surveillance system is applied.

FIG. 14 is a conceptual diagram of a stadium to which the video surveillance system 1 is applied. For example, the above-mentioned video surveillance system 1 is applied to a stadium where many persons gather, as shown in FIG. 14. In this case, plural surveillance cameras 9 are installed at positions where images of spectators' seats, passages, entrances, and the like can be captured, and plural regions where a large number of persons are likely to be present are respectively set in the surveillance regions. The surveillance control apparatus 10 (detection unit 13) detects that a state of a plurality of persons (a crowd) has changed all at once in the surveillance region, as a predetermined event. In the present exemplary embodiment, the predetermined event is handled as an abnormal state. For example, as a predetermined event (abnormal state), the surveillance control apparatus 10 detects that crowds, who appear in the images of the surveillance cameras 9 that capture images of the audience seats, start to run all together outward from a certain point.

Figure 15:
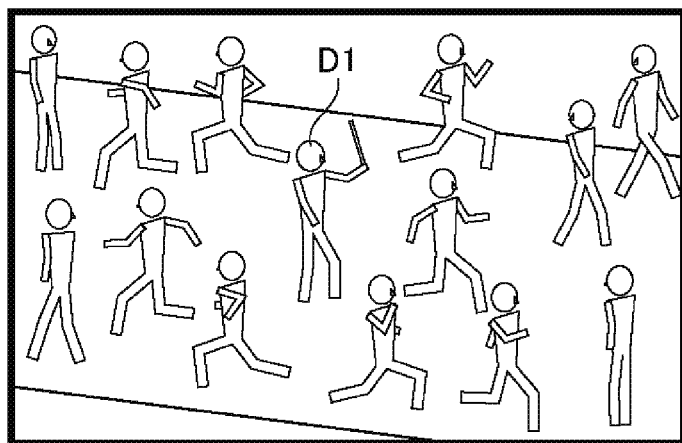
FIG. 15 is a diagram illustrating a specific example of a predetermined event.

FIG. 15 is a diagram illustrating a specific example of the predetermined event. The example of FIG. 15 shows that a person D1 is wielding a weapon. In this case, the surveillance control apparatus 10 detects that plural persons appearing in the image start to run outward from the person D1 as a center, as a predetermined event.

The surveillance control apparatus 10 (the camera control unit 14) is installed in the vicinity of the surveillance region where the predetermined event (abnormal state) is detected, and controls all the surveillance cameras 9 capable of capturing images of the surveillance region at once such that the cameras capture images of the surveillance region. Thus, it is possible to capture images of the cause of the abnormal state, for example, images of a person who suddenly wields the weapon (refer to FIG. 15) from various directions. As a result, it is possible to easily specify the perpetrator even in ex-post verification.

As another example, plural regions in which a large number of persons are likely to be present are respectively set in the detection target regions, and plural surveillance target regions corresponding to the detection target regions are set. For example, the vicinities of spectator seats are set as the detection target regions, and plural entrances are set as the surveillance target regions. The surveillance control apparatus 10 (detection unit 13) detects that a state of a plurality of persons (a crowd) has changed all at once in the detection target region, as a predetermined event (abnormal state). As in the example of FIG. 15, as a predetermined event (abnormal state), the surveillance control apparatus 10 detects that crowds, who appear in the images of the surveillance cameras 9 that capture images of the spectator seats, start to run all together outward from a certain point.

The surveillance control apparatus 10 (camera control unit 14) selects a plurality of surveillance cameras 9 capable of capturing images of the surveillance target region (entrance) corresponding to the detection target region in which the predetermined event (abnormal state) is detected. The surveillance control apparatus 10 controls all the plurality of selected surveillance cameras 9 at once such that the cameras capture images of the surveillance target region (entrance). Thereby, even when the suspicious person escapes from the point (the detection target region) where the suspicious person wielded the weapon, all the plurality of entrances is already set under surveillance at that time. Thus, it is possible to reliably check appearance of the suspicious person.

In the plurality of flowcharts used in the above description, plural steps (processes) are sequentially described, but the order of the steps executed in each exemplary embodiment is not limited to the order of description. In each exemplary embodiment, it is possible to change the order of steps shown in the drawing within a range that does not cause a problem in terms of the processing details thereof. Further, the above-mentioned exemplary embodiments may be combined as long as the processing details do not contradict each other.

Some or all of the above processing details may be specified as follows. However, the above processing details are not limited to the following description.

1. A video surveillance system including:
    a detection unit that detects a predetermined event on the basis of an image captured by a first imaging apparatus; and
    a control unit that controls a second imaging apparatus such that the second imaging apparatus captures an image of a predetermined position after the detection of the predetermined event.

2. The video surveillance system according to 1,
    in which, after the detection of the predetermined event, the control unit selects a movable imaging apparatus capable of capturing the image of the predetermined position, from among a plurality of movable imaging apparatuses each of which is capable of changing an image capturing direction, controls the selected movable imaging apparatus, and excludes an unselected movable imaging apparatus from a control target at the time of detecting the predetermined event.

3. The video surveillance system according to 1 or 2,
    in which the detection unit detects the predetermined event at the predetermined position which is included in the image captured by the first imaging apparatus.

4. The video surveillance system according to 1 or 2,
in which the detection unit detects the predetermined event at another predetermined position which is included in the image captured by the first imaging apparatus and is different from the predetermined position.

5. The video surveillance system according to 4, further including
a correspondence storage unit that stores a plurality of pieces of correspondence relationship information of a relationship between a predetermined detection target position at which the predetermined event has been detected, and a predetermined surveillance target position which corresponds to the predetermined detection target position among a plurality of predetermined surveillance target positions,
in which the control unit specifies the second imaging apparatus which is capable of capturing an image of the predetermined surveillance target position corresponding to the predetermined detection target position at which the predetermined event has been detected, with reference to the pieces of correspondence relationship information, after the detection of the predetermined event.

6. The video surveillance system according to any one of 1 to 5,
in which the detection unit detects a target object's passing across a video surveillance line or a predetermined situation of the target object in a surveillance region as the predetermined event.

7. The video surveillance system according to 6,
in which the detection unit detects, as the predetermined event, that the target object's passing across the video surveillance line or the predetermined situation of the target object in the surveillance region occurs for a plurality of target objects during a predetermined time interval.

8. A video surveillance method executed by at least one computer, the video surveillance method including:
detecting a predetermined event on the basis of an image captured by a first imaging apparatus; and
controlling a second imaging apparatus such that the second imaging apparatus captures an image of a predetermined position after the detection of the predetermined event.

9. The video surveillance method according to 8, further including:
selecting a movable imaging apparatus capable of capturing the image of the predetermined position, from among a plurality of movable imaging apparatuses each of which is capable of changing an image capturing direction, after the detection of the predetermined event; and
excluding an unselected movable imaging apparatus from a control target at the time of detecting the predetermined event,
in which the step of controlling the second imaging apparatus includes controlling the selected movable imaging apparatus as the second imaging apparatus.

10. The video surveillance method according to 8 or 9,
in which the step of detecting of the predetermined event includes detecting the predetermined event at the predetermined position which is included in the image captured by the first imaging apparatus.

11. The video surveillance method according to 8 or 9,
in which the step of detecting the predetermined event includes detecting the predetermined event at another predetermined position which is included in the image captured by the first imaging apparatus and is different from the predetermined position.

12. The video surveillance method according to 11, further including:
referring to a correspondence storage unit that stores a plurality of pieces of correspondence relationship information of a predetermined detection target position at which the predetermined event is detected, and a predetermined surveillance target position which corresponds to the predetermined detection target position from among a plurality of predetermined surveillance target positions; and
specifying the second imaging apparatus capable of capturing an image of the predetermined surveillance target position corresponding to the predetermined detection target position at which the predetermined event has been detected.

13. The video surveillance method according to any one of Nos. 8 to 12,
in which the step of detecting the predetermined event includes detecting a target object's passing across a video surveillance line or a predetermined situation of the target object in a surveillance region as the predetermined event.

14. The video surveillance method according to 13,
in which the step of detecting the predetermined event includes detecting an occurrence of the target object's passing across the video surveillance line or the predetermined situation of the target object in the surveillance region for a plurality of target objects during a predetermined time interval as the predetermined event.

15. A program for causing at least one computer to execute the video surveillance method according to any one of 8 to 14.

The invention claimed is:

1. A video surveillance method performed by a first surveillance camera, a second surveillance camera and at least one processor comprising:
capturing an image of a partial area of a surveillance target place by the first surveillance camera;
detecting an abnormal state on the basis of the image captured by the first surveillance camera;
implementing a controlling of the second surveillance camera such that the second surveillance camera captures an image of an area close to the partial area after the detection of the abnormal state; and
capturing the image of the area close to the partial area by the second surveillance camera after the controlling,
wherein the surveillance target place is a station or a railway platform,
wherein the abnormal state includes a first state in which a train moves toward the station or the railway platform and a second state in which a number of people passing across a video surveillance line on a path leading to an escalator per unit time is greater than a threshold,
wherein, in the controlling, the second surveillance camera is controlled to capture an image of an area of the station or the railway platform along a rail track when the first state is detected and to capture an image of an area including an entrance of an escalator when the second state is detected.

2. The video surveillance method according to claim 1:
wherein the area close to the partial area is the partial area captured at different angle between the first surveillance camera and the second surveillance camera.

3. The video surveillance method according to claim 1:
wherein the second surveillance camera is associated with the first surveillance camera in advance.

4. The video surveillance method according to claim 1:
wherein the area close to the partial area is an area a person, an animal or a vehicle will appear.

5. The video surveillance method according to claim 1:
 detecting one of the first state or the second state on the basis of the image captured by the first surveillance camera; and
 controlling the second surveillance camera such that the second surveillance camera captures an image of a first area when the first state is detected, and controlling the second surveillance camera such that the second surveillance camera captures an image of a second area when the second state is detected.

6. The video surveillance method according to claim 1:
 wherein the second state is detected on the basis of an image captured by a third surveillance camera, instead of the image captured by the first surveillance camera.

7. A video surveillance system comprising:
 at least one memory storing instructions; and
 at least one processor configured to execute the instructions to perform:
 detecting an abnormal state on the basis of an image captured by a first surveillance camera which captures an image of a partial area of a surveillance target place; and
 implementing a controlling of a second surveillance camera such that the second surveillance camera captures an image of a predetermined area after the detection of the abnormal state,
 wherein, in the controlling, the second surveillance camera is controlled to capture an image of a predetermined area according to a type of the abnormal state detected,
 wherein the surveillance target place is a station or a railway platform,
 wherein the abnormal state includes a first state in which a train moves toward the station or the railway platform and a second state in which a number of people passing across a video surveillance line on a path leading to an escalator per unit time is greater than a threshold, and
 wherein, in the controlling, the second surveillance camera is controlled to capture an image of an area of the station or the railway platform along a rail track when the first state is detected and to capture an image of an area including an entrance of the escalator when the second state is detected.

8. The video surveillance system according to claim 7:
 wherein the predetermined area is the partial area captured at different angle between the first surveillance camera and the second surveillance camera.

9. The video surveillance system according to claim 7:
 wherein the predetermined area is an area where a person, a animal or a vehicle will appear.

10. The video surveillance system according to claim 8:
 wherein the second surveillance camera is associated with the first surveillance camera in advance.

11. The video surveillance system according to claim 7:
 wherein the at least one processor is configured to execute the instructions to perform:
 detecting one of the first state or the second state on the basis of the image captured by the first surveillance camera; and
 controlling the second surveillance camera such that the second surveillance camera captures an image of a first area when the first state is detected, and controlling the second surveillance camera such that the second surveillance camera captures an image of a second area when the second state is detected.

12. The video surveillance system according to claim 7:
 wherein the second state is detected on the basis of an image captured by a third surveillance camera, instead of the image captured by the first surveillance camera.

13. A non-transitory computer readable medium storing an instruction for causing at least one computer to execute a video surveillance method, the video surveillance method comprising:
 detecting an abnormal state on the basis of an image captured by a first surveillance camera which captures an image for a partial area of a surveillance target place; and
 implementing a controlling of a second surveillance camera such that the second surveillance camera captures an image of a predetermined area after the detection of the abnormal state,
 wherein, in the controlling, the second surveillance camera is controlled to capture an image of a predetermined area according to a type of the abnormal state detected,
 wherein the surveillance target place is a station or a railway platform,
 wherein the abnormal state includes a first state in which a train moves toward the station or the railway platform and a second state in which a number of people passing across a video surveillance line on a path leading to an escalator per unit time is greater than a threshold, and
 wherein, in the controlling, the second surveillance camera is controlled to capture an image of an area of the station or the railway platform along a rail track when the first state is detected and to capture an image of an area including an entrance of the escalator when the second state is detected.

\* \* \* \* \*